United States Patent
Lee et al.

(10) Patent No.: US 9,537,352 B2
(45) Date of Patent: Jan. 3, 2017

(54) DIFFERENTIAL LOAD DETECTING METHOD FOR DETECTING A WIRELESS POWER RECEIVER IN WIRELESS POWER NETWORK AND WIRELESS POWER TRANSMITTER

(71) Applicant: Samsung Electronics Co., Ltd., Gyeonggi-do (KR)

(72) Inventors: Kyung-Woo Lee, Seoul (KR); Soo-Yeon Jung, Seoul (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 339 days.

(21) Appl. No.: 14/275,350

(22) Filed: May 12, 2014

(65) Prior Publication Data
US 2014/0333145 A1    Nov. 13, 2014

(30) Foreign Application Priority Data

May 10, 2013    (KR) .................. 10-2013-0053453

(51) Int. Cl.
*H02J 17/00*    (2006.01)
*H02J 5/00*    (2016.01)

(52) U.S. Cl.
CPC ............... *H02J 17/00* (2013.01); *H02J 5/005* (2013.01)

(58) Field of Classification Search
CPC ....................................... H02J 7/025
USPC .......................................... 307/104
See application file for complete search history.

(56) References Cited

U.S. PATENT DOCUMENTS

| | | |
|---|---|---|
| 2012/0223587 A1 | 9/2012 | Nishiyama et al. |
| 2012/0235509 A1 | 9/2012 | Ueno et al. |
| 2014/0361738 A1 | 12/2014 | Lee et al. |

FOREIGN PATENT DOCUMENTS

| | | |
|---|---|---|
| JP | 2012-044752 | 3/2012 |
| KR | 1020130142862 | 12/2013 |
| KR | 1020140007237 | 1/2014 |
| WO | WO 2008/038203 | 4/2008 |
| WO | WO 2011/063054 | 5/2011 |
| WO | WO 2012/157969 | 11/2012 |
| WO | WO 2013/038808 | 3/2013 |
| WO | WO 2013/059300 | 4/2013 |

OTHER PUBLICATIONS

European Search Report dated Nov. 17, 2016 issued in counterpart application No. 14794057.1-1804.

*Primary Examiner* — Robert Deberadinis
(74) *Attorney, Agent, or Firm* — The Farrell Law Firm, P.C.

(57) ABSTRACT

A differential load detection apparatus and method are provided for detecting a wireless power receiver in a wireless power network. The differential load detection method includes transmitting first detection power for detecting the wireless power receiver, transmitting second detection power when an impedance variation greater than a first predetermined threshold value and equal to or less than a second threshold value is detected, and waiting for a reception of an advertisement signal according to the transmission of the second detection power from the wireless power receiver.

16 Claims, 18 Drawing Sheets

DIFFERENTIAL LOAD DETECTING METHOD FOR DETECTING A WIRELESS POWER RECEIVER IN WIRELESS POWER NETWORK AND WIRELESS POWER TRANSMITTER

PRIORITY

This application claims priority under 35 U.S.C. §119(a) to Korean Patent Application Serial No. 10-2013-0053453, which was filed in the Korean Intellectual Property Office on May 10, 2013, the contents of which are incorporated herein by reference.

BACKGROUND OF THE INVENTION

1. Field of the Invention

The present invention relates generally to a wireless charging network, and more particularly, to a differential load detecting method for detecting a wireless power receiver in a wireless power network, in which a wireless power transmitter is capable of detecting the wireless power receiver in the wireless charging network.

2. Description of the Related Art

Mobile terminals such as a mobile phone and a Personal Digital Assistant (PDA) are driven with rechargeable batteries, and the battery of the mobile terminal is charged through supplied electronic energy by using a separate charging apparatus. Separate contact terminals are generally arranged outside of the charging apparatus and the battery, which are electrically connected to each other through contact between the contact terminals.

However, since the contact terminal is outwardly protruded in such a contact type charging scheme, the contact terminal is easily contaminated and exposed to moisture, which compromises battery charging. Recently, a wireless charging or a non-contact charging technology has been developed to obviate these problems.

Such a wireless charging technology employs wireless power transmission/reception, and corresponds to, for example, a system in which a battery can be automatically charged if the battery is laid on a charging pad, without the need of a connection between the mobile phone and a separate charging connector. The wireless charging technology is widely used with wireless electrical toothbrushes and shavers, which greatly aids the portability of electronic devices since there is no need for a wired charger. Therefore, technologies related to the wireless charging technology are expected to be significantly developed in the coming age of electric cars.

The wireless charging technology largely includes an electromagnetic induction scheme using a coil, a resonance scheme using a resonance, and a Radio Frequency (RF)/microwave radiation scheme converting electrical energy to a microwave and then transmitting the microwave.

To this point, the electromagnetic induction scheme has been mainstream, but it is expected that all electronic products will eventually be wirelessly charged, in view of recent successful experiments for wirelessly transmitting power to a destination spaced away by dozens of meters through the use of microwaves.

A power transmission method through the electromagnetic induction corresponds to a scheme of transmitting electric power between a first coil and a second coil. When a magnet is moved in a coil, an induction current occurs. By using the induction current, a magnetic field is generated at a transferring end, and electric current is induced according to a change of the magnetic field so as to create energy at a reception end. The phenomenon is referred to as magnetic induction, and the electric power transmission method using magnetic induction has high energy transmission efficiency.

With respect to the resonance scheme, Prof Soljacic of the Massachusetts Institute of Technology (MIT) announced a system in which electricity is wirelessly transferred using an electric power transmission principle of the resonance scheme based on a coupled mode theory, even if a device to be charged is separated from a charging device by several meters (m). A wireless charging system of an MIT team employs a concept in physics that resonance is the tendency in which when a tuning fork oscillates at a particular frequency, a wine glass next to the tuning fork oscillates at the same frequency. The research team makes an electromagnetic wave containing electrical energy resonate instead of making sounds resonate. The resonated electrical energy is directly transferred only when there is a device having a resonance frequency and parts of electrical energy which are not used are reabsorbed into an electromagnetic field instead of being spread in the air. Thus, it is considered that the electrical energy does not affect surrounding humans or machines, unlike other electromagnetic waves.

Active research on a wireless charging scheme is currently taking place. However, standards for a wireless charging order, a search for a wireless power transmitting unit and a wireless power receiving unit, selection of a communication frequency between the wireless power transmitting unit and the wireless power receiving unit, a wireless power control, selection of a matching circuit, and communication time distribution to each wireless power receiver in one charging cycle have not been proposed.

Particularly, when the Power Transmitting Unit (PTU) detects a load, a possibility of fault detection increases if a threshold for a variation of impedance is too small, while a possibility of failing to detect a small object increases if the threshold for the variation of the impedance is too large.

Accordingly, there is a need in the art for a method in which the wireless PTU can effectively detect the load.

SUMMARY OF THE INVENTION

The present invention has been developed to solve the foregoing problems in the conventional art, and an aspect of the present invention is to provide a differential load detecting method for detecting a wireless power receiver in a wireless power network, which is capable of effectively detecting a load by setting a plurality of thresholds for a variation of impedance when a wireless PTU detects the load according to the variation of the impedance.

In accordance with an aspect of the present invention, a differential load detection method for detecting a wireless power receiver in a wireless power network includes transmitting first detection power for detecting the wireless power receiver, transmitting second detection power when an impedance variation greater than a first predetermined threshold value and equal to or less than a second threshold value is detected, and waiting for a reception of an advertisement signal according to the transmission of the second detection power from the wireless power receiver.

In accordance with another aspect of the present invention, a wireless power transmitter for detecting a wireless power receiver in a wireless power network includes a power transmitting unit configured to transmit first detection power or second detection power for detecting the wireless power receiver, and a controller configured to control the power transmitting unit to transmit the second detection power and to wait for a reception of the advertisement signal according to the transmission of the second detection power when an impedance variation greater than a first threshold value but less than a second threshold value is detected during the transmission of the first detection power in the power transmitting unit.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
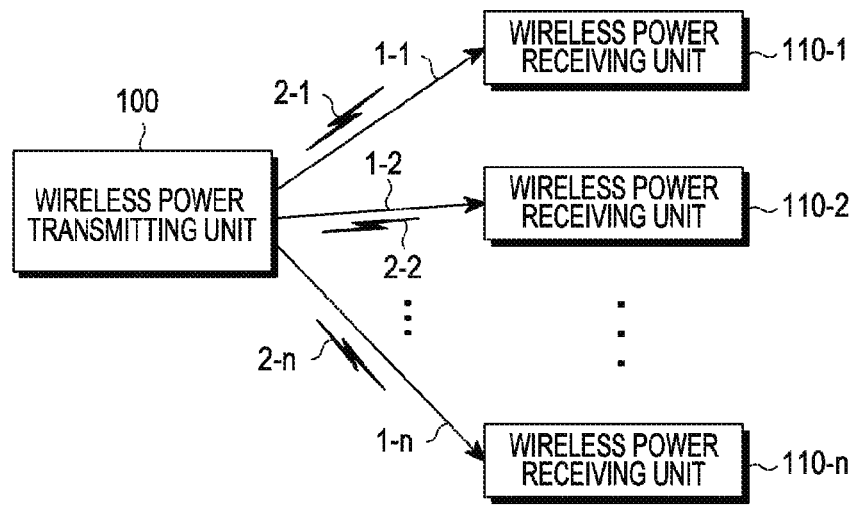
FIG. 1 illustrates a concept describing overall operations of a wireless charging system.

Hereinafter, various embodiments of the present invention will be described more specifically with reference to the accompanying drawings. It should be noted that the same components of the drawings are designated by the same reference numeral anywhere. In the following description of the present invention, a detailed description of known functions and configurations incorporated herein will be omitted when it may make the subject matter of the present invention rather unclear.

A concept of a wireless charging system that may be applied to embodiments of the present invention will be described with reference to FIGS. 1 to 11, and a load detection system according to embodiments of the present invention will be described in detail with reference to FIGS. 12 to 19.

FIG. 1 illustrates a concept describing general operations of a wireless charging system. As illustrated in FIG. 1, the wireless charging system includes a wireless power transmitting unit 100 and one or more wireless power receiving units 110-1, 110-2, . . . , and 110-$n$.

The wireless power transmitting unit 100 may wirelessly transmit power 1-1, 1-2, . . . , and 1-$n$ to the one or more wireless power receiving units 110-1, 110-2, . . . , and 110-$n$, respectively. More specifically, the wireless power transmitting unit 100 may wirelessly transmit power 1-1, 1-2, . . . , and 1-$n$ to only wireless power receiving units which have been authenticated through a predetermined authentication procedure.

The wireless power transmitting unit 100 may form an electrical connection with the wireless power receiving units 110-1, 110-2, . . . , and 110-$n$. For example, the wireless power transmitting unit 100 may transmit wireless power in an electromagnetic wave form to the wireless power receiving units 110-1, 110-2, . . . , 110-$n$.

The wireless power transmitting unit 100 may perform bidirectional communication with the wireless power receiving units 110-1, 110-2, . . . , and 110-$n$. The wireless power transmitting unit 100 and the wireless power receiving units 110-1, 110-2, . . . , and 110-$n$ may process or transmit packets 2-1, 2-2, . . . , and 2-$n$ including predetermined frames. The wireless power receiving unit may be implemented with devices such as a mobile communication terminal, a PDA, a Portable Media Player (PMP), and a smart phone.

The wireless power transmitting unit 100 may wirelessly provide electric power to a plurality of wireless power receiving units 110-1, 110-2, . . . , and 110-$n$. For example, the wireless power transmitting unit 100 may transmit electric power to the one or more wireless power receiving units 110-1, 110-2, . . . , and 110-$n$ through a resonant scheme. When the wireless power transmitting unit 100 adopts the resonant scheme, it is preferable that a distance between the wireless power transmitting unit 100 and the one or more wireless power receiving units 110-1, 110-2, . . . , and 110-$n$ is equal to or less than 30 m. When the wireless power transmitting unit 100 adopts the electromagnetic induction scheme, it is preferable that a distance between the wireless power transmitting unit 100 and the plurality of wireless power receiving units 110-1, 110-2, . . . , and 110-*n* is equal to or less than 10 cm.

The wireless power receiving units 110-1, 110-2, . . . , and 110-*n* may receive wireless power from the wireless power transmitting unit 100 to charge batteries therein. The wireless power receiving units 110-1,110, -2,110-2, . . . , and 110-*n* may transmit a signal for requesting wireless power transmission, information required for wireless power reception, state information of the wireless power receiving unit, or control information of the wireless power transmitting unit 100 to the wireless power transmitting unit 100

The wireless power receiving units 110-1, 110-2, . . . , and 110-*n* may transmit a message indicating a charging state of each of the wireless power receiving units 110-1, 110-2, . . . , and 110-*n* to the wireless power transmitting unit 100.

The wireless power transmitting unit 100 may include a display means such as a display, and display a state of each of the wireless power receiving units 110-1, 110-2, and 110-*n* based on the message received from each of the wireless power receiving units 110-1, 110-2, . . . , and 110-*n*. The wireless power transmitting unit 100 may also display a time expected to be required until each of the wireless power receiving units 110-1, 110-2, . . . , and 110-*n* is completely charged.

The wireless power transmitting unit 100 may transmit a control signal for disabling a wireless charging function to each of the wireless power receiving units 110-1, 110-2, . . . , and 110-*n*. The wireless power receiving units having received the disabled control signal of the wireless charging function from the wireless power transmitting unit 100 may disable the wireless charging function.

Figure 2:
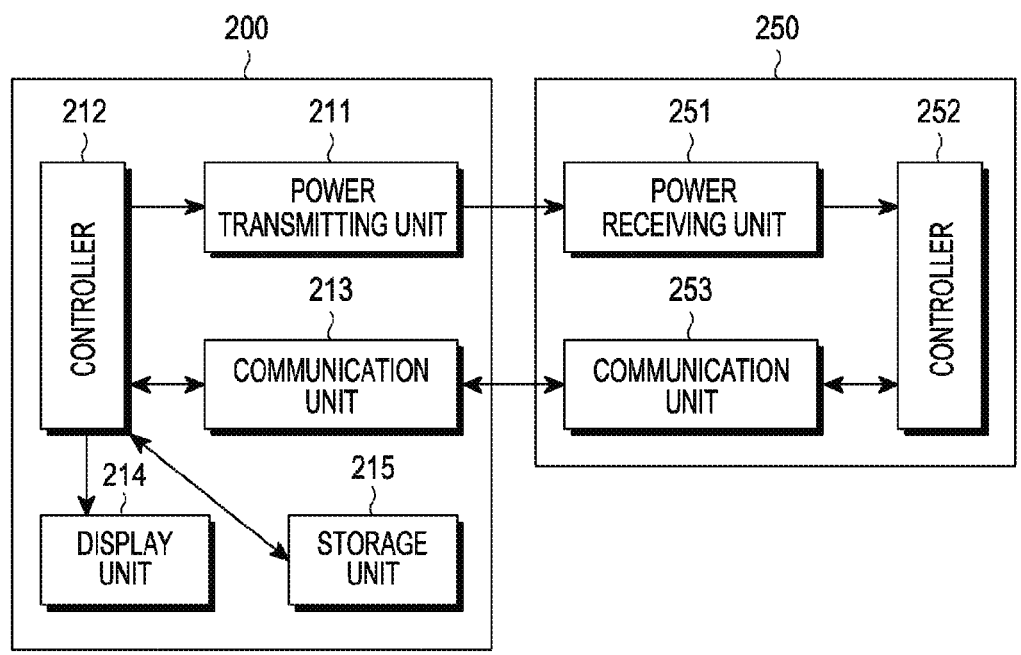
FIG. 2 is a block diagram of a wireless power transmitting unit and a wireless power receiving unit according to an embodiment of the present invention.

FIG. 2 illustrates a wireless power transmitting unit and a wireless power receiving unit according to an embodiment of the present invention.

As illustrated in FIG. 2, the wireless power transmitter 200 may include a power transmitting unit 211, a controller 212 and a communication unit 213. The wireless power receiver 250 may include a power receiving unit 251, a controller 252 and a communication unit 253.

The power transmitting unit 211 may supply power which is required by the wireless power transmitter 200, and wirelessly provide power to the wireless power receiver 250. The power transmitting unit 211 may provide the power in a form of alternate current waves, and also may convert direct current waves into the alternate current waves by using an inverter while providing the power in a form of direct current waves, so as to provide the power in the form of alternate current. The power transmitting unit 211 may be implemented in a form of an embedded battery or in a form of a power receiving interface so as to receive the power from outside thereof and supply the power to the other components. It will be easily understood by those skilled in the art that the power transmitting unit 211 is not limited if it can supply power of constant alternate current waves.

In addition, the power transmitting unit 211 may supply the alternate current waves to the wireless power receiver 250 as electromagnetic waves. The power transmitting unit 211 may further include a resonant circuit, resulting in transmission or reception of predetermined electromagnetic waves. When the power transmitting unit 211 is implemented by the resonant circuit, inductance L of a loop coil of the resonant circuit may be changed. It will be easily understood by those skilled in the art that the power transmitting unit 211 is not limited if it can transmit and receive the electromagnetic waves.

The controller 212 may control overall operations of the wireless power transmitter 200 by using an algorithm, a program, or an application which is required for a control and read from a storage unit (not shown). For example, the controller 212 may be implemented in a form of a Central Processing Unit (CPU), a microprocessor, or a mini computer. Operation of the controller 212 will be described below in detail.

The communication unit 213 may communicate with the wireless power receiver 250 in a specific manner. The communication unit 213 may communicate with a communication unit 253 of the wireless power receiver 250 by using, for example, a Near Field Communication (NFC) scheme, a Zigbee® communication scheme, an infrared ray communication scheme, a visible ray communication scheme, a Bluetooth® communication scheme, or a Bluetooth® Low Energy (BLE) scheme. In addition, the communication unit 213 may use a Carrier Sense Multiple Access with Collision Avoidance (CSMA/CA) algorithm. The above mentioned communication schemes are only examples, and the scope of the present invention is not limited by a specific communication scheme which is performed by the communication unit 213.

The communication unit 213 may transmit a signal for information of the wireless power transmitter 200. The communication unit 213 may unicast, multicast, or broadcast the signal. Table 1 shows a data structure of a signal transmitted from the wireless power transmitter 200 according to an embodiment of the present invention. The wireless power transmitter 200 may transmit a signal having the following frame on every preset period, and the signal may be referred to as a notice signal hereinafter.

TABLE 1

| frame type | protocol version | sequence number | network ID | RX to Report (schedule mask) | Re-served | Number of Rx |
|---|---|---|---|---|---|---|
| Notice | 4 bit | 1 Byte | 1 Byte | 1 Byte | 5 bit | 3 bit |

A frame type in Table 1 refers to a field indicating a type of signal, and indicates that a corresponding signal is a notice signal in Table 1. A protocol version field indicates a type of protocol of a communication scheme and may be allocated, for example, 4 bits. A sequence number field indicates a sequential order of the corresponding signal and may be allocated, for example, 1 byte. For example, the sequence number may increase by one for each signal transmission/reception step. A network ID field indicates a network ID of the wireless power transmitter 200 and may be allocated, for example, 1 byte. An Rx to Report (schedule mask) field indicates wireless power receiving units for providing a report to the wireless power transmitter 200 and may be allocated, for example, 1 byte. Table 2 shows the Rx to Report (schedule mask) field according to an embodiment of the present invention.

TABLE 2

| Rx to Report(schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

Rx1 to Rx8 may correspond to first to eighth wireless power receiving units. The Rx to Report (schedule mask) field may be implemented such that the wireless power receiving unit having a schedule mask number of 1 provides a report.

A reserved field is reserved for future use and may be allocated, for example, 5 bytes. A number of Rx field indicates a number of wireless power receiving units located near the wireless power transmitter 200 and may be allocated, for example, 3 bits.

The communication unit 213 may receive power information from the wireless power receiver 250. The power information may include at least one of a capacity of the wireless power receiver 250, a residual battery amount, a number of times of charges, an amount of use, a battery capacity, and a proportion of the battery. The communication unit 213 may transmit a signal of controlling a charging function in order to control the charging function of the wireless power receiver 250. The controlling the charging function signal may be a control signal of controlling the wireless power receiving unit 251 of the specific wireless power receiver 250 so as to enable or disable the charging function to. More specifically, the power information may include, for example, information on an insertion of a wireless charging terminal, a transition from a Stand Alone (SA) mode to an Non-Stand Alone (NSA) mode, and error state release.

The communication unit 213 may receive a signal from another wireless power transmitting unit (not shown) as well as the wireless power receiver 250. For example, the communication unit 213 may receive a notice signal of the frame in the above Table 1 from another wireless power transmitting unit.

In FIG. 2, the power transmitting unit 211 and the communication unit 213 are configured as different hardware and the wireless power transmitter 200 communicates in an out-band manner, but this is only an example. In the present invention, the power transmitting unit 211 and the communication unit 213 may be implemented as one hardware component so that the wireless power transmitter 200 performs communication in an in-band manner.

The wireless power transmitter 200 and the wireless power receiver 250 may transmit and receive various signals. Accordingly, the wireless power receiver 250 enters a wireless power network which is managed by the wireless power transmitter 200 and performs a charging process through wireless power transmission and reception.

Figure 3:
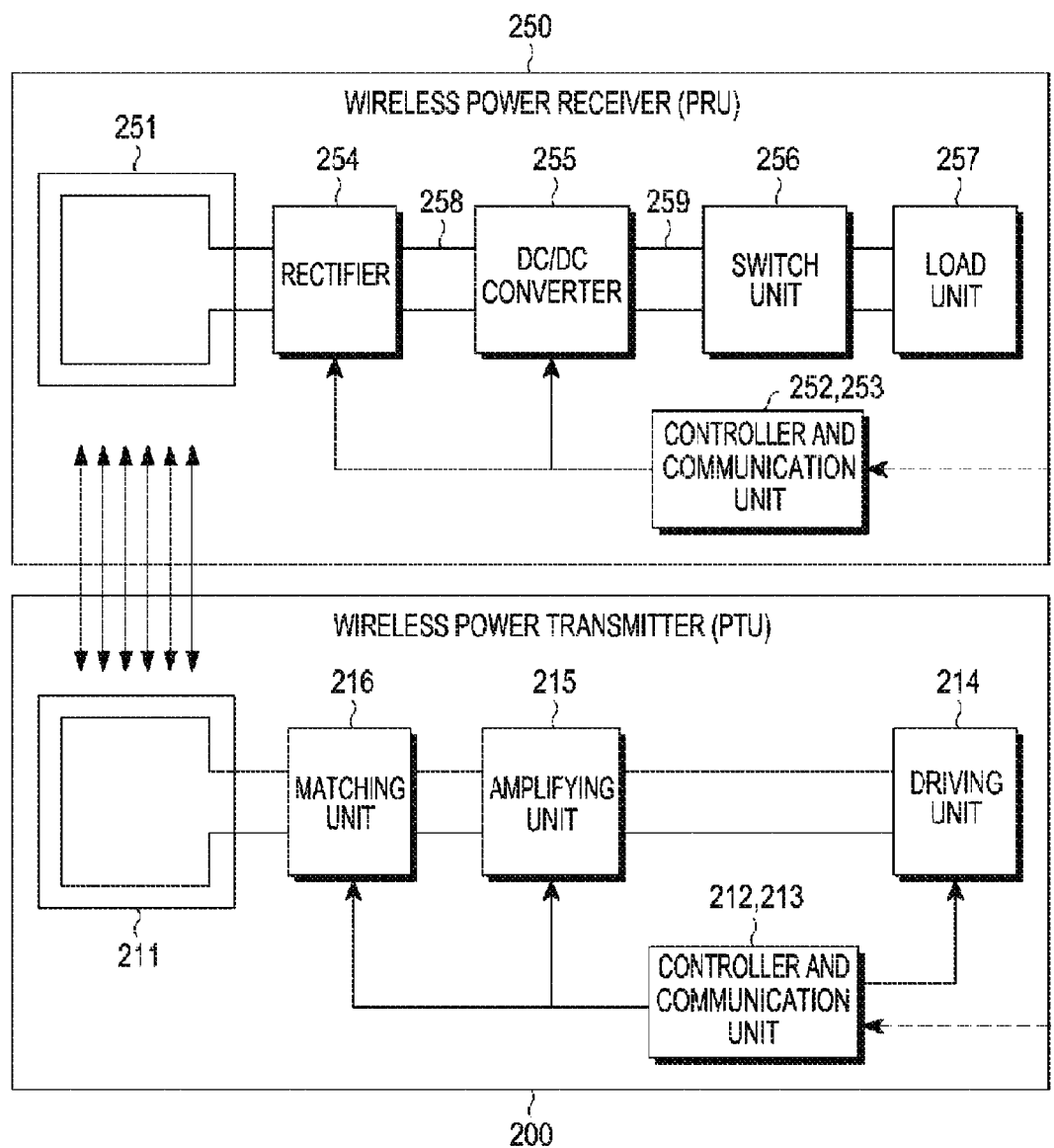
FIG. 3 illustrates in detail a wireless power transmitting unit and a wireless power receiving unit according to an embodiment of the present invention.

FIG. 3 illustrates in detail the wireless power transmitting unit and the wireless power receiving unit according to an embodiment of the present invention.

As illustrated in FIG. 3, the wireless power transmitter 200 may include the power transmitting unit 211, the controller/communication unit 212/213 (or MCU & Out-of-band Signaling unit), a driver (or power supply unit) 214, an amplifier 215, and a matching unit 216. The wireless power receiver 250 may include the power receiving unit 251, the controller/communication unit 252/253, a rectifier 254, a Direct Current (DC)/DC converter 255, a switch unit 256, and a load unit 257.

The driver 214 may output DC power having a preset voltage value. The voltage value of the DC power output by the driver 214 may be controlled by the controller/communication unit 212/213.

The DC power output from the driver 214 may be output to the amplifier 215. The amplifier 215 may amplify the DC power by a preset gain. The amplifier 215 may convert DC power to Alternating Current (AC) power based on a signal input from the controller/communication unit 212/213. Accordingly, the amplifier 215 may output AC power.

The matching unit 216 may perform impedance matching. For example, the matching unit 216 may adjust impedance viewed from the matching unit 216 to control output power to be high efficiency or high output power. The matching unit 216 may adjust impedance based on a control of the controller/communication unit 212/213. The matching unit 216 may include at least one of a coil and a capacitor. The controller/communication unit 212/213 may control a connection state with at least one of the coil and the capacitor, and accordingly, perform impedance matching.

The power transmitting unit 211 may transmit input AC power to the power receiving unit 251. The power transmitting unit 211 and the power receiving unit 251 may be implemented by resonant circuits having the same resonance frequency. For example, the resonance frequency may be determined as 6.78 MHz.

The controller/communication unit 212/213 may communicate with the controller/communication unit 252/253 of the wireless power receiver 250, and perform communication, for example, with a bi-directional 2.4 GHz frequency.

The power receiving unit 251 may receive charging power.

The rectifier 254 may rectify wireless power received by the power receiving unit 251 in the form of direct current, and may be implemented as a bridge diode. The DC/DC converter 255 may convert the rectified current into a predetermined gain. For example, the DC/DC converter 255 converts the rectified electric current so that a voltage of an output end 259 becomes 5V. A minimum value and a maximum value of the voltage which can be applied may be preset for a front end 258 of the DC/DC converter 255.

The switch unit 256 may connect the DC/DC converter 255 and the load unit 257. The switch unit 256 may maintain an on/off state under a control of the controller 252. When the switch unit 256 is in the on state, the load unit 257 may store converted power which is input from the DC/DC converter 255.

Figure 4:
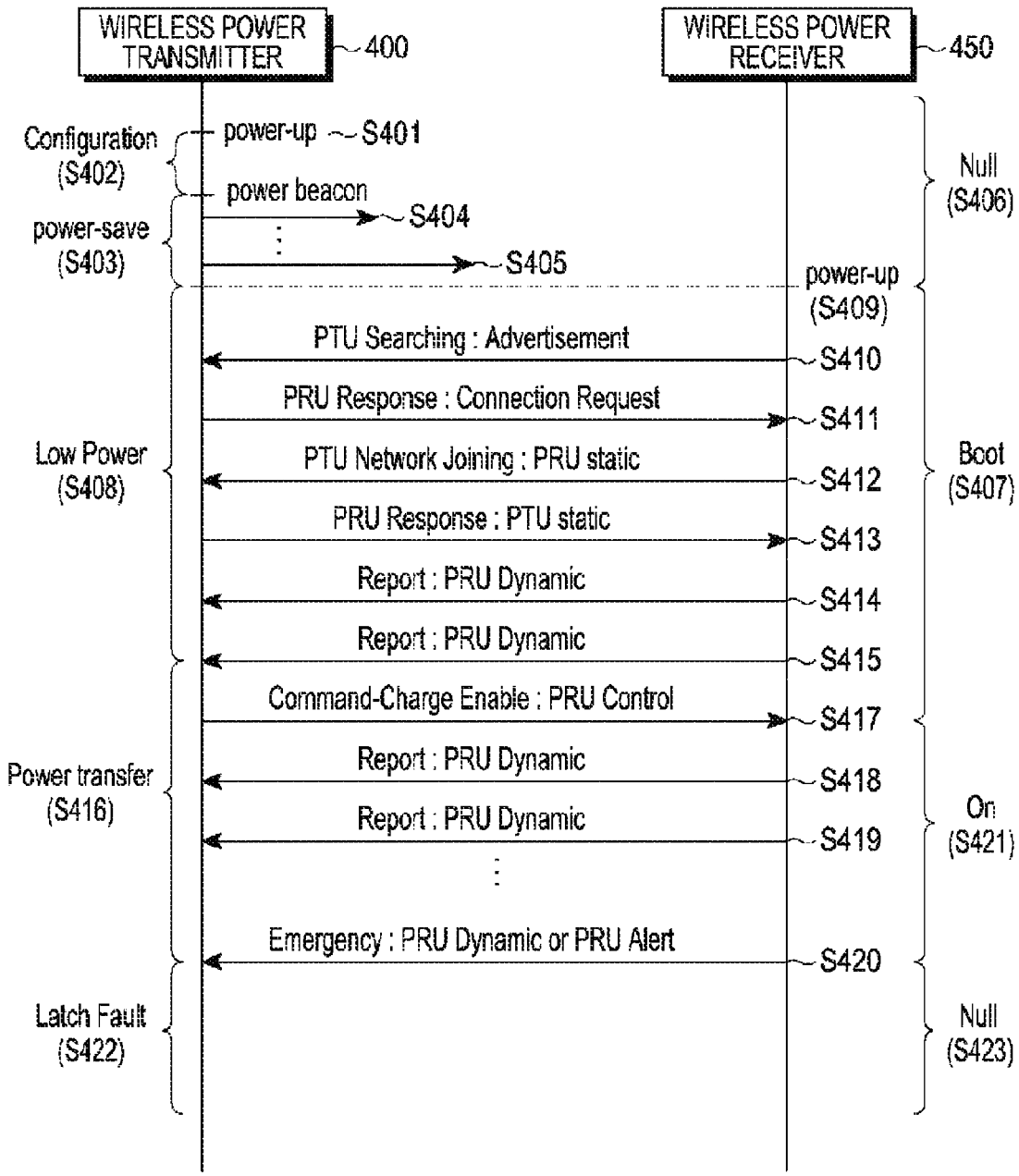
FIG. 4 illustrates operations of a wireless power transmitting unit and a wireless power receiving unit according to an embodiment of the present invention.

FIG. 4 illustrates operations of the wireless power transmitting unit and the wireless power receiving unit according to an embodiment of the present invention. As illustrated in FIG. 4, a wireless power transmitter 400 may apply power in step S401. When the power is applied, the wireless power transmitter 400 may configure an environment in S402.

The wireless power transmitter 400 may enter a power save mode in step S403. In the power save mode, the wireless power transmitter 400 may apply different types of power beacons for detection according to their own periods, which will be described in more detail with reference to FIG. 6. For example, in FIG. 4, the wireless power transmitter 400 may apply detection power beacons 404 and 405 and sizes of power values of the detection power beacons 404 and 405 may be different. A part or all of the detection power beacons 404 and 405 may have power enough to drive the communication unit of the wireless power receiver 450. For example, the wireless power receiver 450 may drive the communication unit by the part or all of the detection power beacons 404 and 405 to communicate with the wireless power transmitter 400. The above state may be named a null state.

The wireless power transmitter 400 may detect a load change by an arrangement of the wireless power receiver 450. The wireless power transmitter 400 may enter a low power mode in step S409. The low power mode will be described in more detail with reference to FIG. 6. The wireless power receiver 450 may drive the communication unit based on power received from the wireless power transmitter 400 in step S409.

The wireless power receiver 450 may transmit a PTU searching signal to the wireless power transmitter 400 in step S410. The wireless power receiver 450 may transmit the PTU searching signal as an advertisement signal based on BLE. The wireless power receiver 450 may transmit the PTU searching signal periodically or until a preset time arrives and may receive a response signal from the wireless power transmitter 400.

When receiving the PTU searching signal from the wireless power receiver 450, the wireless power transmitter 400 may transmit a Power Receiving Unit (PRU) response signal in step S411. The PRU response signal may form a connection between the wireless power transmitter 400 and the wireless power receiver 450.

The wireless power receiver 450 may transmit a PRU static signal in step S412. The PRU static signal may be a signal indicating a state of the wireless power receiver 450 may make a request for joining the wireless power network managed by the wireless power transmitter 400.

The wireless power transmitter 400 may transmit a PTU static signal in step S413. The PTU static signal transmitted by the wireless power transmitter 400 may be a signal indicating a capability of the wireless power transmitter 400.

When the wireless power transmitter 400 and the wireless power receiver 450 transmit and receive the PRU static signal and the PTU static signal, the wireless power receiver 450 may periodically transmit a PRU dynamic signal in steps S414 and S415. The PRU dynamic signal may include at least one parameter information measured by the wireless power receiver 450. For example, the PRU dynamic signal may include voltage information of a back end of the rectifier of the wireless power receiver 450. The state of the wireless power receiver 450 may be referred to as a boot state.

The wireless power transmitter 400 may enter a power transfer mode in step S416 and may transmit a PRU command signal corresponding to a command signal to allow the wireless power receiver 450 to be charged in step S417. In the power transfer mode, the wireless power transmitter 400 may transmit charging power.

The PRU command signal transmitted by the wireless power transmitter 400 may include information enabling/disabling the charging of the wireless power receiver 450 and permission information. The PRU command signal may be transmitted when the wireless power transmitter 400 changes the state of the wireless power receiver 450 or periodically, for example, a period of 250 ms.

The wireless power receiver 450 may change a configuration according to the PRU command signal and transmit the PRU dynamic signal for reporting the state of the wireless power receiver 450 in steps S418 and S419. The PRU dynamic signal transmitted by the wireless power receiver 450 may include at least one of information on a voltage, a current, a state of the wireless power receiver 450, and temperature. The state of the wireless power receiver 450 may be called an on-state.

The PRU dynamic signal may have a data structure as shown in Table 3 below.

TABLE 3

| Field | octets | description | use | units |
|---|---|---|---|---|
| optional fields | 1 | defines which optional fields are populated | mandatory | |

TABLE 3-continued

| Field | octets | description | use | units |
|---|---|---|---|---|
| Vrect | 2 | voltage at diode output | mandatory | mV |
| Irect | 2 | current at diode output | mandatory | mA |
| Vout | 2 | voltage at charge/battery port | optional | mV |
| Iout | 2 | current at charge/battery port | optional | mA |
| temperature | 1 | temperature of PRU | optional | Deg C. from −40 C. |
| Vrect min dyn | 2 | Vrect low limit(dynamic value) | optional | mV |
| Vrect set dyn | 2 | desired Vrect (dynamic value) | optional | mV |
| Vrect high dyn | 2 | Vrect high limit (dynamic value) | optional | mV |
| PRU alert | 1 | warnings | mandatory | Bit field |
| RFU | 3 | undefined | | |

The PRU dynamic signal may include at least one of optional field information, voltage information of the back end of the rectifier of the wireless power receiving unit, current information of the back end of the rectifier of the wireless power receiving unit, voltage information of the back end of the DC/DC converter of the wireless power receiving unit, current information of the back end of the DC/DC converter of the wireless power receiving unit, temperature information, minimum voltage value information of the back end of the rectifier of the wireless power receiving unit, optimal voltage value information of the back end of the rectifier of the wireless power receiving unit, maximum voltage value information of the back end of the rectifier of the wireless power receiving unit, and alert information as shown in Table 3.

The alert information may have a data structure as shown in Table 4 below.

TABLE 4

| 7 | 6 | 5 | 4 | 3 | 2 | 1 | 0 |
|---|---|---|---|---|---|---|---|
| over voltage | over current | over temperature | charge complete | TA detect | transition | restart request | RFU |

The alert information may include, for example, over voltage, over current, over temperature, charge complete, TA detection, SA mode/NSA mode transition, and restart request, as shown in Table 4.

The wireless power receiver 450 may receive the PRU command signal to perform the charging. For example, when the wireless power transmitter 400 has enough power to charge the wireless power receiver 450, the wireless power transmitter 400 may transmit the PRU command signal for enabling the charging. The PRU command signal may be transmitted whenever the charging state is changed. The PRU command signal may be transmitted, for example, every 250 ms, or transmitted when a parameter is changed. The PRU command signal may be set to be transmitted within a preset threshold, for example, within one second even though the parameter is not changed.

The wireless power receiver 450 may detect generation of errors. The wireless power receiver 450 may transmit an alert signal to the wireless power transmitter 400 in step S420. The alert signal may be transmitted as the PRU dynamic signal or the alert signal. For example, the wireless power receiver 450 may transmit the PRU alert field of Table 3 reflecting an error state to the wireless power transmitter 400. Alternatively, the wireless power receiver 450 may transmit a single alert signal indicating the error state to the wireless power transmitter 400. When receiving the alert signal, the wireless power transmitter 400 may enter a latch fault mode in step S422. The wireless power receiver 450 may enter a null state in step S423.

Figure 5:
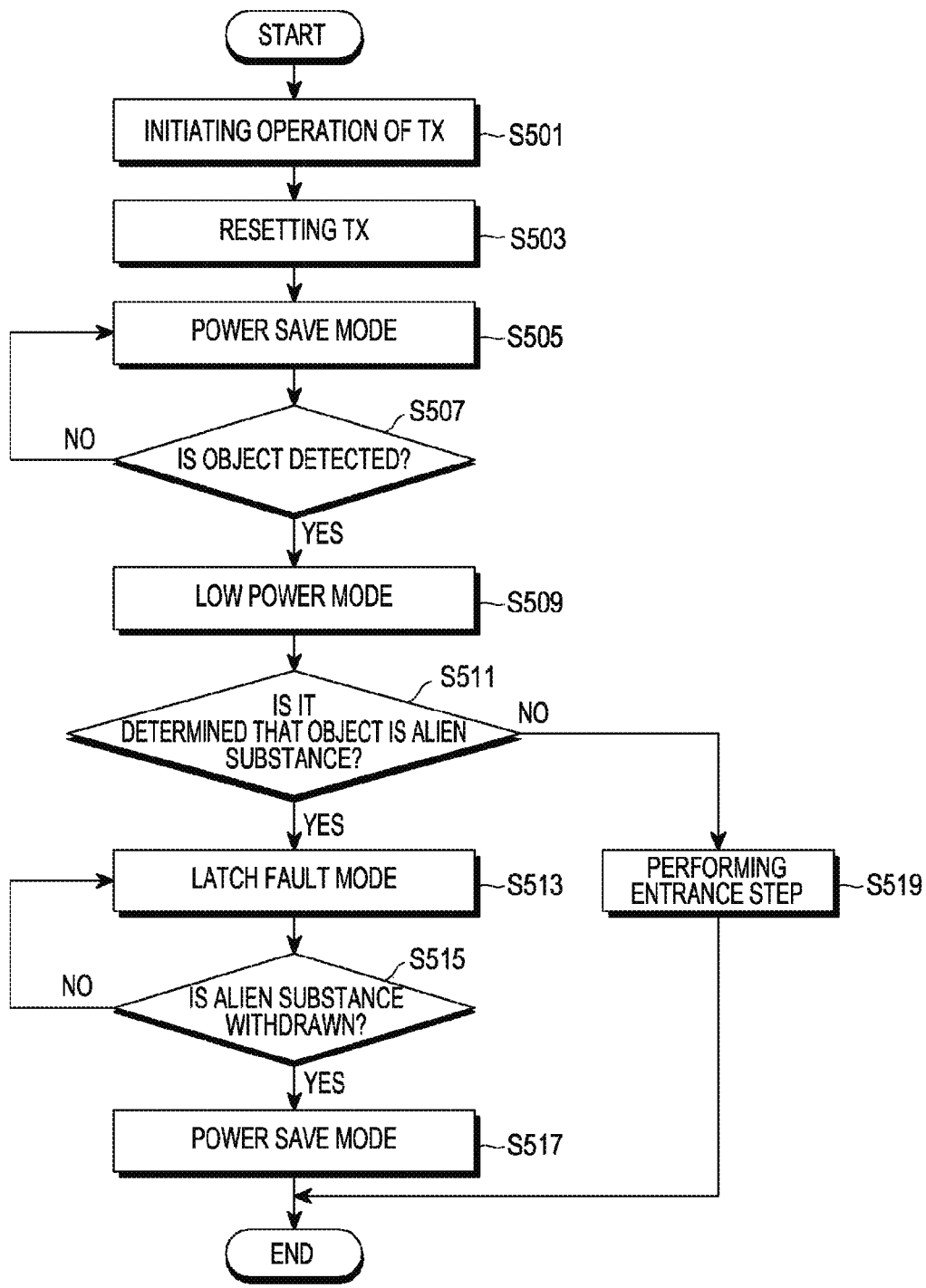
FIG. 5 illustrates operations of a wireless power transmitting unit and a wireless power receiving unit according to another embodiment of the present invention.
Figure 6:
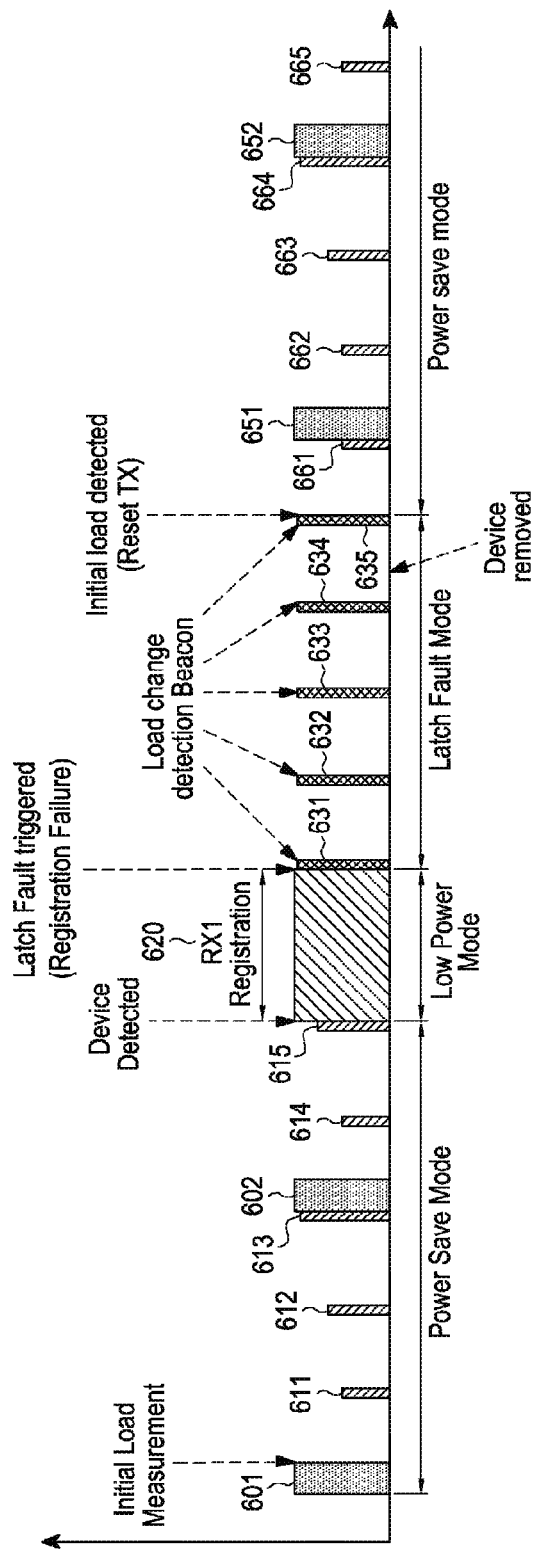
FIG. 6 is a graph on an x-axis of an amount of power applied by a wireless power transmitting unit.

FIG. 5 illustrates operations of the wireless power transmitting unit and the wireless power receiving unit according to another embodiment of the present invention. A control method of FIG. 5 will be described in more detail with reference to FIG. 6, which is a graph on an x-axis of a power amount applied by the wireless power transmitting unit according to an embodiment of FIG. 5.

As illustrated in FIG. 5, the wireless power transmitting unit may initiate the operation in step S501. The wireless power transmitting unit may reset an initial configuration in step S503. The wireless power transmitting unit may enter a power save mode in step S505. The power save mode may correspond to an interval where the wireless power transmitting unit applies power having different amounts to the power transmitter. For example, the power save mode may correspond to an interval where the wireless power transmitting unit applies second detection power 601 and 602 and third detection powers 611, 612, 613, 614, and 615 to the power transmitter in FIG. 6. The wireless power transmitting unit may periodically apply the second detection powers 601 and 602 according to a second period. When the wireless power transmitting unit applies the second detection powers 601 and 602, the applying may continue for a second term. The wireless power transmitting unit may periodically apply the third detection powers 611, 612, 613, 614, and 615 according to a third period. When the wireless power transmitting unit applies the third detection powers 611, 612, 613, 614, and 615, the applying may continue for a third term. Although it is illustrated that power values of the third detection powers 611, 612, 613, 614, and 615 are different from each other, the power values of the third detection powers 611, 612, 613, 614, and 615 may be the same or different.

The wireless power transmitting unit may output the third detection power 611 and then output the third detection power 612 having the same size of the power amount. As described above, when the wireless power transmitting unit outputs the third detection power having the same size, the power amount of the third detection power may have a power amount by which a smallest wireless power receiving unit, for example, a wireless power receiving unit of category 1 can be detected.

The wireless power transmitting unit may output the third detection power 611 and then output the third detection power 612 having a different size of the power amount. As described above, when the wireless power transmitting unit outputs the third detection power having the different size, the power amount of the third detection power may be a power amount by which a wireless power receiving unit of category 1 to category 5 can be detected. For example, when the third detection power 611 has a power amount by which a wireless power receiving unit of category 5 can be detected, the third detection power 612 may have a power amount by which a wireless power receiving unit of category 3 can be detected, and the third detection power 613 may have a power amount by which a wireless power receiving unit of category 1 can be detected.

The second detection powers 601 and 602 may be power that can drive the wireless power receiving unit. More specifically, the second detection powers 601 and 602 may have a power amount that can drive the controller and the communication unit of the wireless power receiving unit.

The wireless power transmitting unit may apply the second detection powers 601 and 602 and the third detection powers 611, 612, 613, 614, and 615 to the power receiver according to a second period and a third period, respectively. When the wireless power receiving unit is arranged on the wireless power transmitting unit, impedance viewed from a point of the wireless power transmitting unit may be changed. The wireless power transmitting unit may detect a change in the impedance while the second detection powers 601 and 602 and the third detection powers 611, 612, 613, 614, and 615 are applied. For example, the wireless power transmitting unit may detect the change in the impedance while the third detection power 615 is applied. Accordingly, the wireless power transmitting unit may detect an object in step S507. When the object is not detected in step S507-NO, the wireless power transmitting unit may maintain a power save mode in which different power is periodically applied.

When there is the change in the impedance and thus the object is detected in step S507-YES, the wireless power transmitting unit may enter a low power mode. The low power mode is a mode in which the wireless power transmitting unit applies driving power having a power amount by which the controller and the communication unit of the wireless power receiving unit can be driven. For example, in FIG. 6, the wireless power transmitting unit may apply driving power 620 to the power transmitter. The wireless power receiving unit may receive the driving power 620 to drive the controller and the communication unit. The wireless power receiving unit may perform communication with the wireless power transmitting unit according to a predetermined scheme based on the driving power 620. For example, the wireless power receiving unit may transmit/receive data required for an authentication, and join the wireless power network managed by the wireless power transmitting unit based on the data. However, when a vague object is arranged instead of the wireless power receiving unit, the data transmission/reception cannot be performed. Accordingly, the wireless power transmitting unit may determine whether the arranged object is the vague object in step S511. For example, when the wireless power transmitting unit does not receive a response from the object within a preset time, the wireless power transmitting unit may determine the object as the vague object.

When the object is determined as the vague object in step S511-YES, the wireless power transmitting unit may enter a latch fault mode. When the object is not determined as the vague object in step S511-NO, the wireless power transmitting unit may perform joining step in step S519. For example, the wireless power transmitting unit may periodically apply first powers 631 to 634 according to a first period in FIG. 6. The wireless power transmitting unit may detect a change in impedance while applying the first power. For example, when the vague object is withdrawn, the impedance change may be detected and the wireless power transmitting unit may determine that the vague object is withdrawn. Alternatively, when the vague object is not withdrawn, the wireless power transmitting unit may not detect the impedance change and may determine that the vague object is not withdrawn, in which case the wireless power transmitting unit may output at least one of a lamp and a warning sound to inform a user that a state of the wireless power transmitting unit is an error state. Accordingly, the wireless power transmitting unit may include an output unit that outputs at least one of the lamp and the warning sound.

When it is determined that the vague object is not withdrawn in step S515-NO, the wireless power transmitting unit may maintain the latch fault mode in step S513. When it is determined that the vague object is withdrawn in step S515-YES, the wireless power transmitting unit may re-enter the power save mode in step S517. For example, the wireless power transmitting unit may apply second powers 651 and 652 and third powers 661 to 665 of FIG. 6.

As described above, when the vague object is arranged instead of the wireless power receiving unit, the wireless power transmitting unit may enter the latch fault mode. The wireless power transmitting unit may determine whether to withdraw the vague object by the impedance change based on the power applied in the latch fault mode. That is, a condition of the entrance into the latch fault mode in an embodiment of FIGS. 5 and 6 may be the arrangement of the vague object. The wireless power transmitting unit may have various latch fault mode entrance conditions as well as the arrangement of the vague object. For example, the wireless power transmitting unit may be cross-connected with the arranged wireless power receiving unit and may enter the latch fault mode in the above case.

Accordingly, when the cross-connection is generated, the wireless power transmitting unit is required to return to an initial state and the wireless power receiving unit is required to be withdrawn. The wireless power transmitting unit may set the cross-connection by which the wireless power receiving unit arranged on another wireless power transmitting unit joins the wireless power network as the latch fault mode entrance condition.

Figure 7:
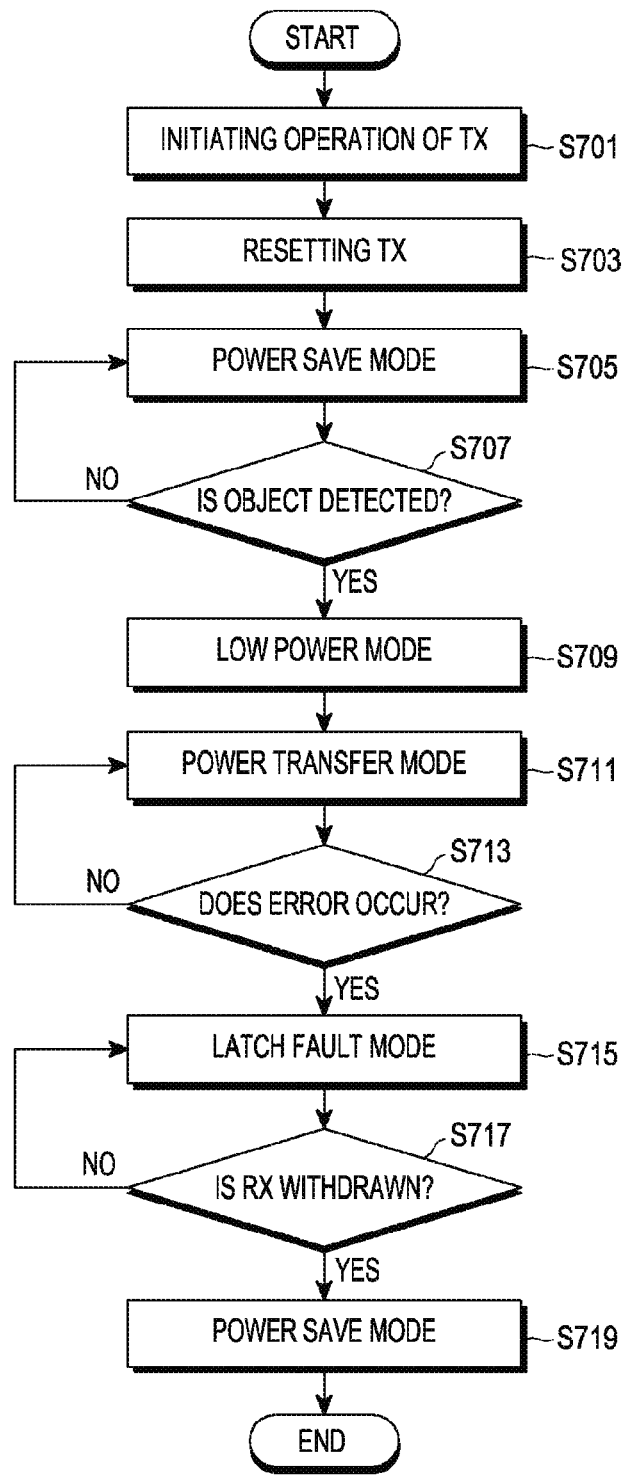
FIG. 7 illustrates a control method of a wireless power transmitting unit according to an embodiment of the present invention.

FIG. 7 illustrates a control method of the wireless power transmitting unit according to an embodiment of the present invention. The control method of FIG. 7 will be described in more detail with reference to FIG. 8, which is a graph on an x-axis of a power amount applied by the wireless power transmitting unit according to an embodiment of FIG. 7.

The wireless power transmitting unit may initiate the operation in step S701. The wireless power transmitting unit may reset an initial configuration in step S703. The wireless power transmitting unit may re-enter the power save mode in step S705. The power save mode may be an interval where the wireless power transmitting unit applies power having different amounts to the power transmitter. For example, the power save mode may correspond to an interval where the wireless power transmitting unit applies second detection powers 801 and 802 and third detection powers 811, 812, 813, 814, and 815 to the power transmitter in FIG. 8. The wireless power transmitting unit may periodically apply the second detection powers 801 and 802 according to a second period. When the wireless power transmitting unit applies the second detection powers 801 and 802, the applying may continue for a second term. The wireless power transmitting unit may periodically apply the third detection powers 811, 812, 813, 814, and 815 according to a third period. When the wireless power transmitting unit applies the third detection powers 811, 812, 813, 814, and 815, the applying may continue for a third term. Although it is illustrated that power values of the third detection powers 811, 812, 813, 814, and 815 are different from each other, the power values of the third detection powers 811, 812, 813, 814, and 815 may be the same or different.

The second detection power 801 and 802 may be power that can drive the wireless power receiving unit. More specifically, the second detection powers 801 and 802 may have a power amount that can drive the controller and the communication unit of the wireless power receiving unit.

The wireless power transmitting unit may apply the second detection powers 801 and 802 and the third detection powers 811, 812, 813, 814, and 815 to the power receiver according to a second period and a third period, respectively. When the wireless power receiving unit is arranged on the wireless power transmitting unit, impedance viewed from a point of the wireless power transmitting unit may be changed. The wireless power transmitting unit may detect the impedance change while the second detection powers 801 and 802 and the third detection powers 811, 812, 813, 814, and 815 are applied. For example, the wireless power transmitting unit may detect the impedance change while the third detection power 815 is applied. Accordingly, the wireless power transmitting unit may detect an object in step S707. When the object is not detected in step S707-NO, the wireless power transmitting unit may maintain the power save mode in which different power is periodically applied in step S705.

When the impedance is changed and thus the object is detected in step S807-YES, the wireless power transmitting unit may enter the low power mode in step S809. In the low power mode, the wireless power transmitting unit applies driving power having a power amount by which the controller and the communication unit of the wireless power receiving unit can be driven. For example, in FIG. 8, the wireless power transmitting unit may apply driving power 820 to the power transmitter. The wireless power receiving unit may receive the driving power 820 to drive the controller and the communication unit. The wireless power receiving unit may perform communication with the wireless power transmitting unit according to a predetermined scheme based on the driving power 820. For example, the wireless power receiving unit may transmit/receive data required for an authentication, and join the wireless power network managed by the wireless power transmitting unit based on the data.

Figure 8:
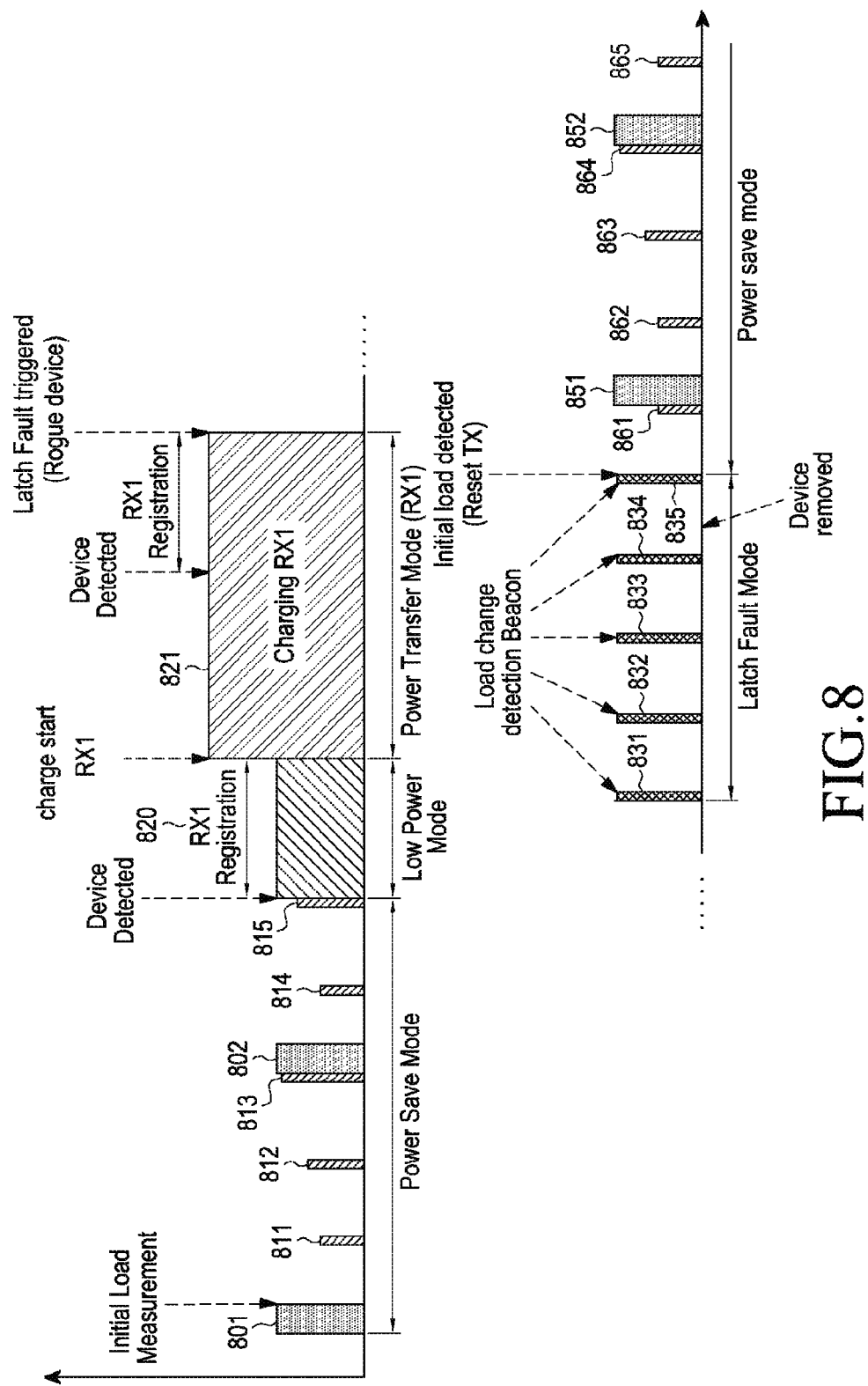
FIG. 8 is a graph on an x-axis of an amount of power applied by a wireless power transmitting unit according to an embodiment of FIG. 7.

Thereafter, the wireless power transmitting unit may enter the power transfer mode in which charging power is transmitted in step S711. For example, the wireless power transmitting unit may apply charging power 821 and the charging power may be transmitted to the wireless power receiving unit as illustrated in FIG. 8.

The wireless power transmitting unit may determine whether an error is generated in the power transfer mode. The error may be the arrangement of the vague object on the wireless power transmitting unit, the cross-connection, over voltage, over current, or over temperature, for example. The wireless power transmitting unit may include a sensing unit that may measure the over voltage, the over current, and over temperature. For example, the wireless power transmitting unit may measure a voltage or a current at a reference position. When the measured voltage or current is greater than a threshold, it is determined that conditions of the over voltage or the over current are satisfied. Alternatively, the wireless power transmitting unit may include a temperature sensing means and the temperature sensing means may measure temperature at a reference position of the wireless power transmitting unit. When temperature at the reference position is greater than a threshold, the wireless power transmitting unit may determine that a condition of the over temperature is satisfied.

Although it has been illustrated that the error is generated since the vague object is additionally arranged on the wireless power transmitting unit in an embodiment of FIG.

8, the error is not limited thereto and it will be easily understood by those skilled in the art that the wireless power transmitting unit operates through a similar process with respect to the arrangement of the vague object, the cross-connection, the over voltage, the over current, and the over temperature.

When the error is not generated in step S713-NO, the wireless power transmitting unit may maintain the power transfer mode in step S711. When the error is generated in step S713-YES, the wireless power transmitting unit may enter the latch fault mode in step S715. For example, the wireless power transmitting unit may apply first powers 831 to 835 as illustrated in FIG. 8. The wireless power transmitting unit may output an error generation display including at least one of a lamp and a warning sound during the latch fault mode. When it is determined that the vague object is not withdrawn in step S717-NO, the wireless power transmitting unit may maintain the latch fault mode in step S715. When it is determined that the vague object is withdrawn in step S717-YES, the wireless power transmitting unit may re-enter the power save mode in step S719. For example, the wireless power transmitting unit may apply second powers 851 and 852 and third powers 861 to 865 of FIG. 8.

In the above description, the operation when the error is generated while the wireless power transmitting unit transmits the charging power has been discussed.

Figure 9:
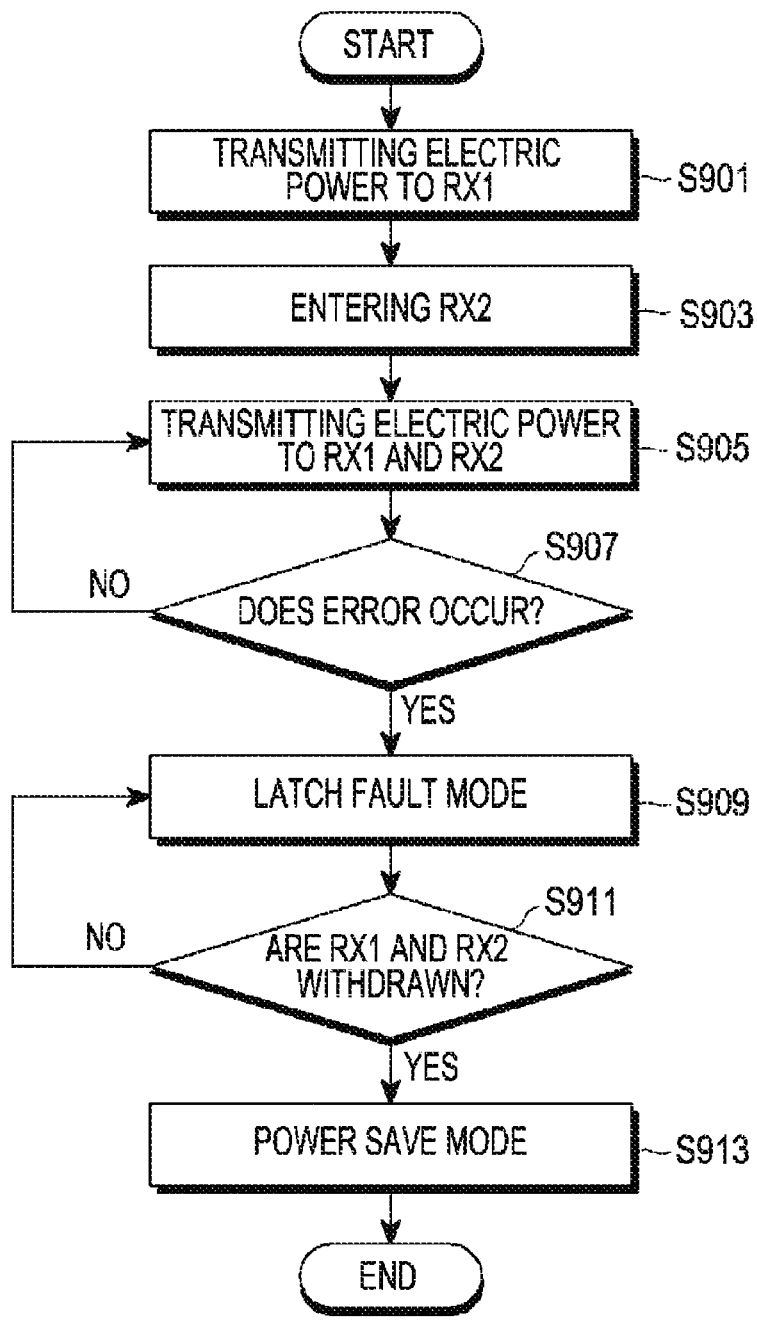
FIG. 9 illustrates a control method of a wireless power transmitting unit according to an embodiment of the present invention.

FIG. 9 illustrates a control method of the wireless power transmitting unit according to an embodiment of the present invention. The control method of FIG. 9 will be described in more detail with reference to FIG. 10, which is a graph on an x-axis of a power amount applied by the wireless power transmitting unit according to an embodiment of FIG. 9.

As illustrated in FIG. 9, the wireless power transmitting unit may transmit charging power to a first wireless power receiving unit in step S901. The wireless power transmitting unit may allow a second wireless power receiving unit to additionally join the wireless power network in step S903. The wireless power transmitting unit may transmit charging power to the second wireless power receiving unit in step S905. More specifically, the wireless power transmitting unit may apply a sum of the charging power required by the first wireless power receiving unit and the second wireless power receiving unit to the power receiver.

Figure 10:
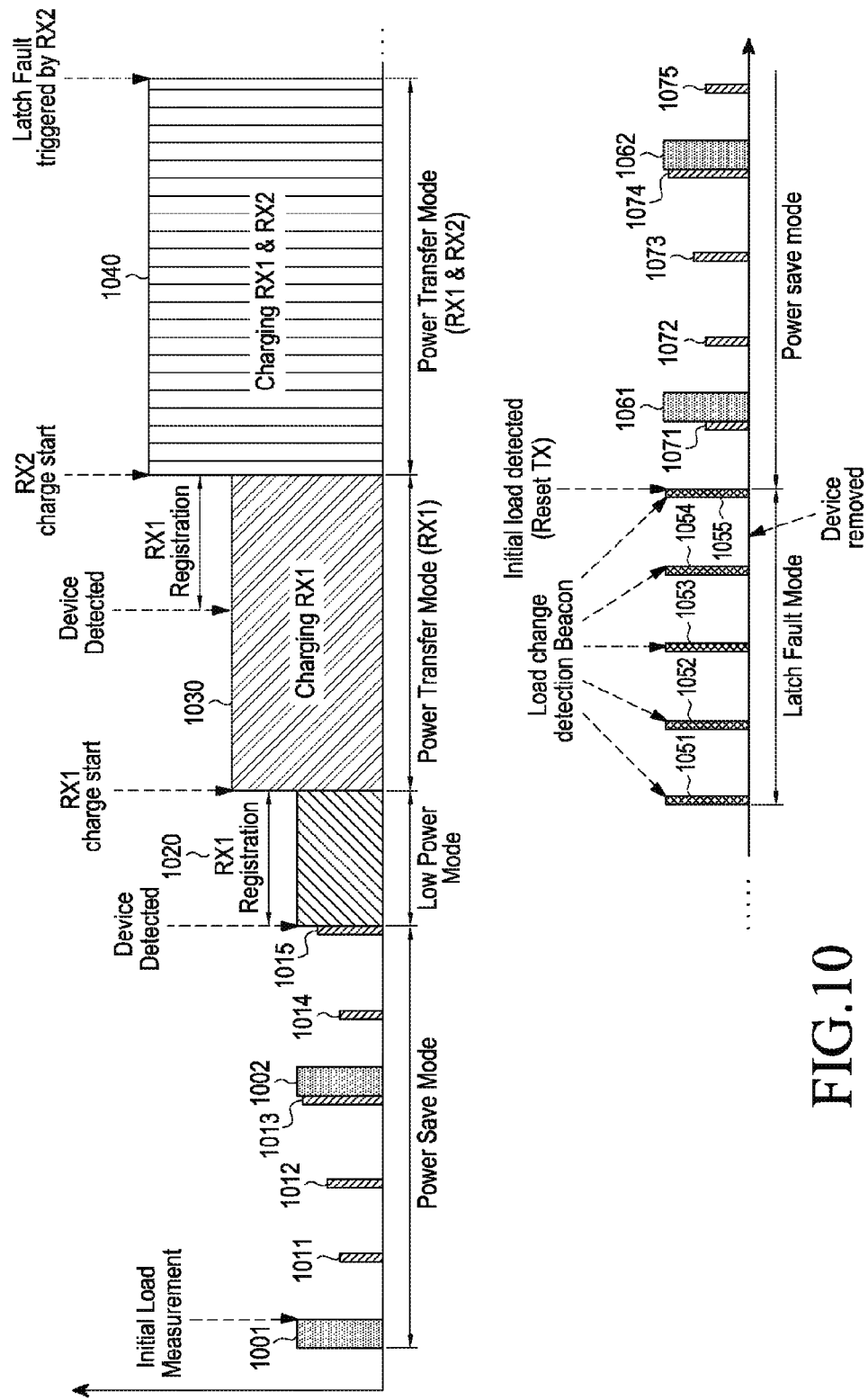
FIG. 10 is a graph on an x-axis of an amount of power applied by a wireless power transmitting unit according to an embodiment of FIG. 9.

FIG. 10 illustrates an embodiment of steps S901 to S905 in FIG. 9. For example, the wireless power transmitting unit may maintain the power save mode in which second detection powers 1001 and 1002 and third detection powers 1011 to 1015 are applied. Thereafter, the wireless power transmitting unit may detect the first wireless power receiving unit and enter the low power mode in which the detection power 1020 is maintained. The wireless power transmitting unit may enter the power transfer mode in which first charging power 1030 is applied. The wireless power transmitting unit may detect the second wireless power receiving unit and allow the second wireless power receiving unit to join the wireless power network. The wireless power transmitting unit may apply second charging power 1040 having a power amount corresponding to a sum of power amounts required by the first wireless power receiving unit and the second wireless power receiving unit.

Referring back to FIG. 9, the wireless power transmitting unit may detect whether an error is generated in step S907 while charging power is transmitted to both the first and second wireless power receiving units in step S905. As described above, the error may be the arrangement of the vague object, the cross-connection, the over voltage, the over current, and the over temperature. When the error is not generated in step S907-NO, the wireless power transmitting unit may maintain the applying of the second charging power 1040.

When the error is generated in step S907-YES, the wireless power transmitting unit may enter the latch fault mode in step S909. For example, the wireless power transmitting unit may apply first powers 1051 to 1055 according to a first period in FIG. 10. The wireless power transmitting unit may determine whether both the first wireless power receiving unit and the second wireless power receiving unit are withdrawn in step S911. For example, the wireless power transmitting unit may detect an impedance change while applying the first powers 1051 to 1055. The wireless power transmitting unit may determine whether both the first wireless power receiving unit and the second wireless power receiving unit are withdrawn based on whether the impedance is returned to an initial value.

When it is determined that both the first wireless power receiving unit and the second wireless power receiving unit are withdrawn in step S911-YES, the wireless power receiving unit may enter the power save mode in step S913. For example, the wireless power transmitting unit may apply second detection powers 1061 and 1062 and third detection powers 1071 to 1075 according to a second period and a third period, respectively.

As described above, even when the wireless power transmitting unit applies charging power to at least one wireless power receiving unit, the wireless power transmitting unit may determine whether the wireless power receiving unit or the vague object is easily withdrawn when the error is generated.

Figure 11:
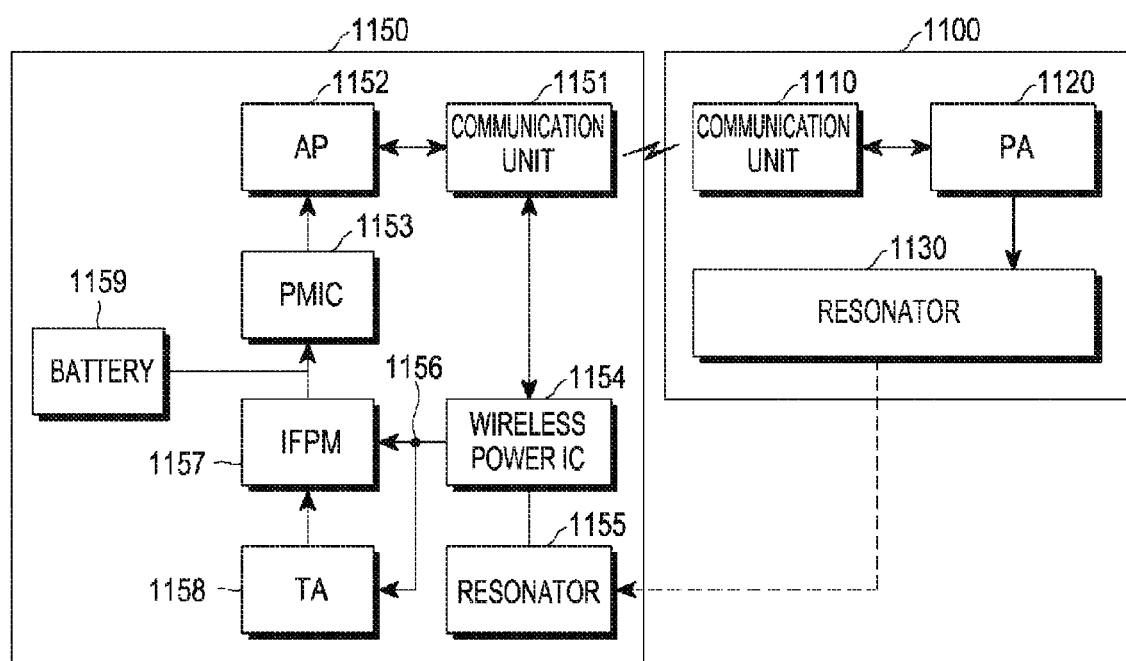
FIG. 11 is a block diagram of a wireless power transmitting unit and a wireless power receiving unit according to an embodiment of the present invention.

FIG. 11 is a block diagram of a wireless power transmitting unit and a wireless power receiving unit according to an embodiment of the present invention.

A wireless power transmitting unit 1100 may include a communication unit 1110, a Power Amplifier (PA) 1120, and a resonator 1130. A wireless power receiving unit 1150 may include a communication unit 1151, an Application Processor (AP) 1152, a Power Management Integrated Circuit (PMIC) 1153, a wireless power Integrated Circuit (IC) 1154, a resonator 1155, an InterFace Power Management (IFPM) IC 1157, a Travel Adapter (TA) 1158, and a battery 1158.

The communication unit 1110 may communicate with the communication unit 1151 based on a predetermined scheme, for example, a BLE scheme. For example, the communication unit 1151 of the wireless power receiving unit 1150 may transmit a PRU dynamic signal having the data structure as shown in Table 3 to the communication unit 1110 of the wireless power transmitting unit 1100. As described above, the PRU dynamic signal may include at least one of voltage information, current information, temperature information, and alert information of the wireless power receiving unit 1150.

Based on the received PRU dynamic signal, a power value output from the power amplifier 1120 may be adjusted. For example, when the over voltage, the over current, and the over temperature are applied to the wireless power receiving unit 1150, a power value output from the power amplifier 1120 may be reduced. When a voltage or current of the wireless power receiving unit 1150 is less than a preset value, a power value output from the power amplifier 1120 may be increased.

Charging power from the resonator 1130 may be wirelessly transmitted to the resonator 1155.

The wireless power IC 1154 may rectify the charging power received from the resonator 1155 and perform DC/DC conversion. The wireless power IC 1154 may drive the communication unit 1151 or charge the battery 1159 by using the converted power.

A wired charging terminal may be inserted into the Travel Adapter (TA) 1158. A wired charging terminal such as 30-pin connector or a Universal Serial Bus (USB) connector may be inserted into the TA 1158, and the TA 1158 may receive power supplied from an external power source to charge the battery 1159.

The IFPM 1157 may process power applied from the wired charging terminal and output the processed power to the battery 1159 and the PMIC 1153.

The PMIC 1153 may manage wirelessly received power, power received through a wire, and power applied to each of the components of the wireless power receiving unit 1150. The AP 1152 may receive power information from the PMIC 1153 and control the communication unit 1151 to transmit the PRU dynamic signal for reporting the power information.

The TA 1158 may be connected to a node 1156 connected to the wireless power IC 1154. When the wired charging connector is inserted into the travel adapter 1158, a preset voltage, for example, 5 V may be applied to the node 1156. The wireless power IC 1154 may monitor the voltage applied to the node 1156 to determine whether the travel adapter is inserted.

Hereinafter, a differential load detecting method for detecting the wireless power receiver in the wireless power network according to an embodiment of the present invention will be described with reference to FIGS. 12 to 19.

Figure 12:
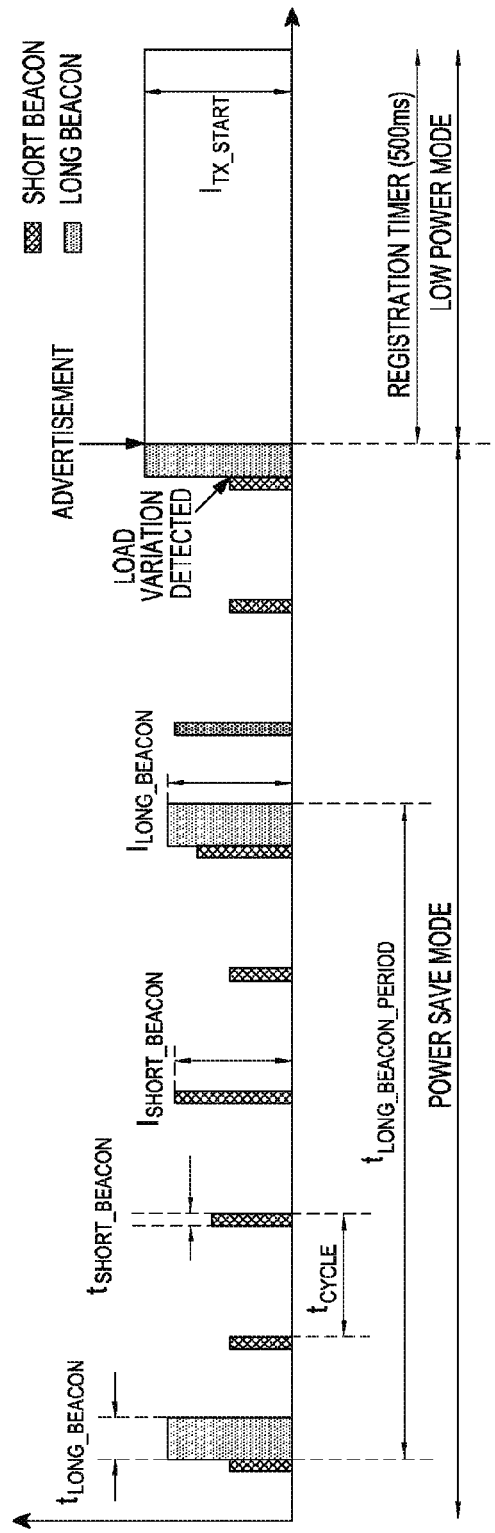
FIG. 12 illustrates a process of detecting the wireless power transmitting unit according to an embodiment of the present invention.

FIG. 12 illustrates a process of detecting the wireless power transmitter according to an embodiment of the present invention. Referring to FIG. 12, the wireless PTU transmits electric power through the first detection power, e.g., short beacon, and monitors a variation of impedance.

In this event, for the load detection, the wireless power transmitter has to detect the variation of impedance greater than a predetermined variation of impedance Zin_load_change.

For example, if the variation of impedance ΔZin exceeds the threshold of the predetermined impedance variation Zin_load_change, the wireless PTU detects that an object is placed thereon. Accordingly, the PTU scans a communication attempt of the object placed thereon. If the communication attempt of the object placed on the wireless PTU is present, the PTU communicates with the object placed thereon through the communication attempt and determines it as an object that may be charged with electric power.

The load detection method may have a contradiction.

For example, when the load is detected, fault detection may possibly increase if a threshold of the impedance variation ΔZin is set to a small value.

However, when the load is detected, a possibility that a small object cannot be detected increases if a threshold of the impedance variation ΔZin is set to a large value.

Figure 13:
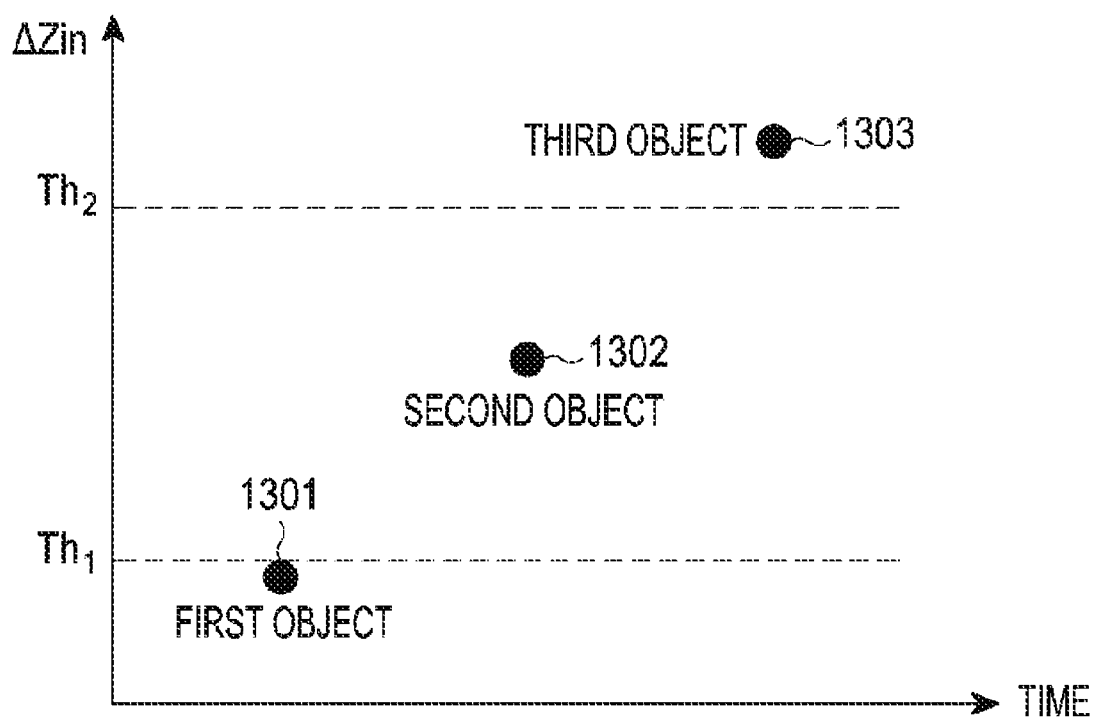
FIG. 13 illustrates a setting of a plurality of threshold values for detecting a load according to an embodiment of the present invention.

Accordingly, in an embodiment of the present invention shown in FIG. 13, the threshold of the impedance variation ΔZin is classified into two parts for the load detection, thereby performing effective load detection according to various impedance variations.

For example, in any condition such as when the small object is placed on the PTU, the load goes past the PTU, or a large object is placed on the PTU, optimal load detection and charging may be performed.

FIG. 13 illustrates a setting of a plurality of threshold values for detecting a load according to an embodiment of the present invention. Referring to FIG. 13, the threshold of the impedance variation for the load detection according to an embodiment of the present invention can be classified into a first threshold $Th_1$ and a second threshold $Th_2$.

The first threshold $Th_1$ is set to be less than the second threshold $Th_2$, so that the PTU is converted to a long beacon mode (second detection power transfer mode) to communicate with the object (load) although it has a small change in a short beacon mode (first detection power transfer mode). That is, the first threshold $Th_1$ is set to increase sensitivity of the load detection.

If the variation ΔZin of the impedance Zin has a value between the first threshold $Th_1$ and the second threshold $Th_2$, the impedance variation ΔZin is detected as a small change, but a large amount of electric power is not consumed because the impedance Zin is small. Accordingly, when the communication attempt is absent in the long beacon mode, the PTU regards this as a fault alert and returns to the power save mode.

The second threshold $Th_2$ is set to be greater than the first threshold $Th_1$ so that the PTU can detect a relatively larger change. If an object causing an impedance variation ΔZin greater than the second threshold $Th_2$ is detected, the PTU is enabled to pass through the long beacon mode and returns to the low power mode.

In this event, if the PTU cannot achieve communication in the low power mode or the registration timer expires, the PTU determines that an alien substance is detected, and proceeds to a latch fault mode.

Referring to FIG. 13, a relatively small impedance variation is detected for the first object 1301. That is, the impedance variation less than the first threshold value $Th_1$ may be detected. Since the impedance variation for the first object 1301 is less than the first threshold value $Th_1$, the first object 1301 may be not detected by the detection of the impedance variation in the PTU and thus may be ignored. The first object 1301 may be detected in only the long beacon mode.

Intermediate impedance variation ΔZin for the second object 1302, for example, the impedance variation between the first threshold $Th_1$ and the second threshold $Th_2$, is detected, in which the impedance variation ΔZin is greater than the first threshold value $Th_1$ but less than the second threshold value $Th_2$. Since the impedance variation ΔZin for the second object 1302 exceeds the first threshold value $Th_1$, the second object 1302 may be detected by the detection of the impedance variation in the PTU.

A relatively large impedance variation ΔZin for the third object 1303, for example, the impedance variation exceeding the second threshold $Th_1$, is detected. That is, the impedance variation greater than the second threshold value $Th_2$ may be detected. Since the impedance variation ΔZin for the third object 1303 exceeds the first threshold value $Th_1$, and the second threshold value $Th_2$, the third object 1303 may be detected by the detection of the impedance variation in the PTU.

Hereinafter, a process of detecting a device depending on a plurality of threshold values will be described with reference to FIGS. 14 and 15.

Figure 14:
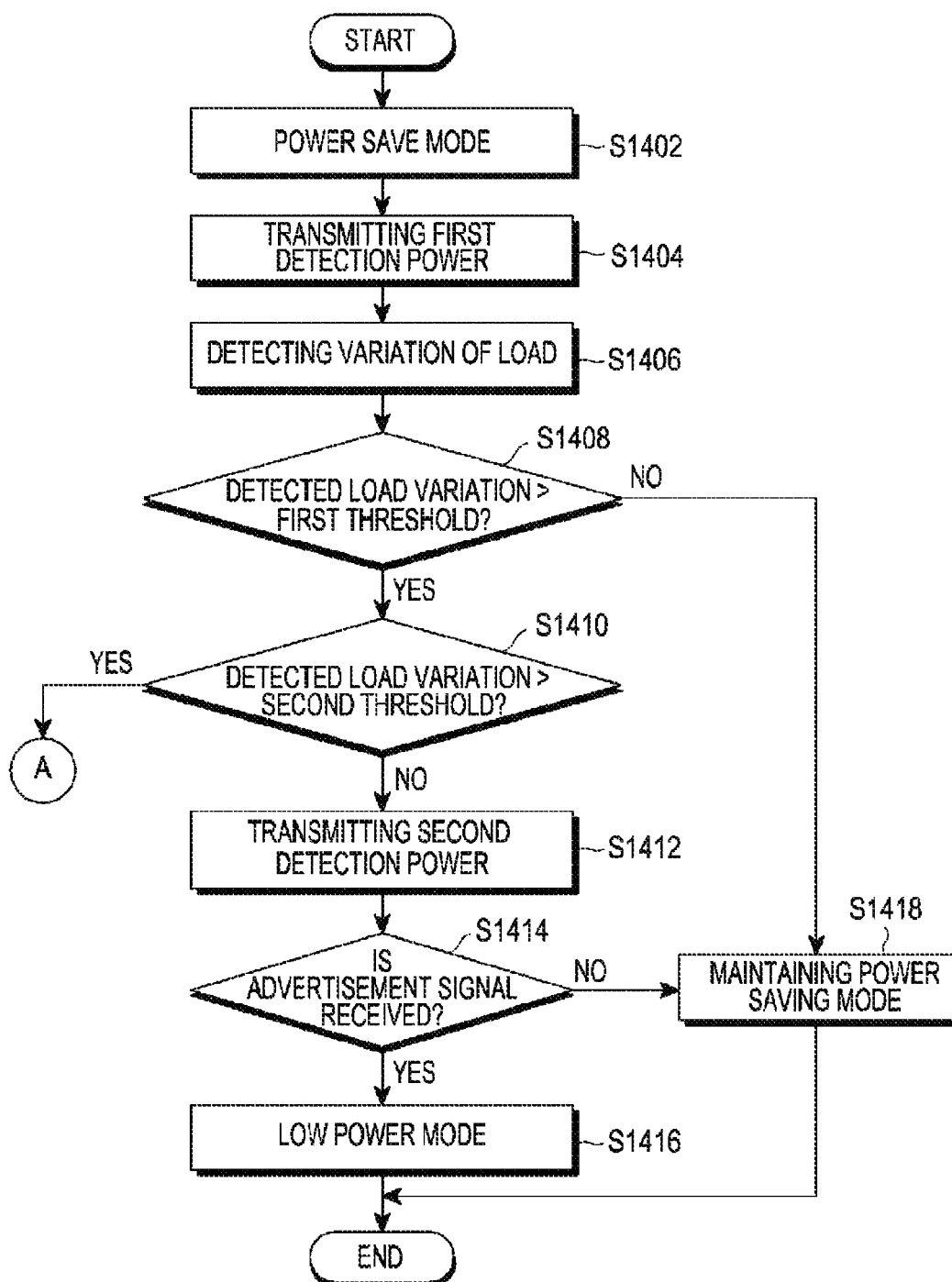
FIGS. 14 and 15 illustrate a process of detecting a device using the plurality of thresholds according to an embodiment of the present invention.

Referring to FIG. 14, the PTU may transmit the first detection power, e.g., a short beacon, for detecting a variation of load in the power save mode in step 1402. If the variation of the load is detected in step S1406, the detected load variation is compared with the first threshold value in step S1408.

As the result of the comparison, if the detected load variation is less than or equal to the first threshold value, the current power save mode is continuously maintained in step S1418.

If the detected load variation is greater than the first threshold value, the detected load variation is compared with the second threshold in step S1410.

As the result of the comparison, if the detected load variation is less than or equal to the second threshold value, i.e., the detected load variation is present between the first threshold value and the second threshold value, second detection power, e.g., a long beacon, is transmitted in step S1412.

When an advertisement signal is received in step S1414 after the PTU transmits the second detection power, the PTU is converted into the low power mode in step S1416 and then performs a registration procedure in the low power mode. If the registration is normally completed, the PTU is converted into the power transfer mode to initiate the electric charge.

Figure 15:
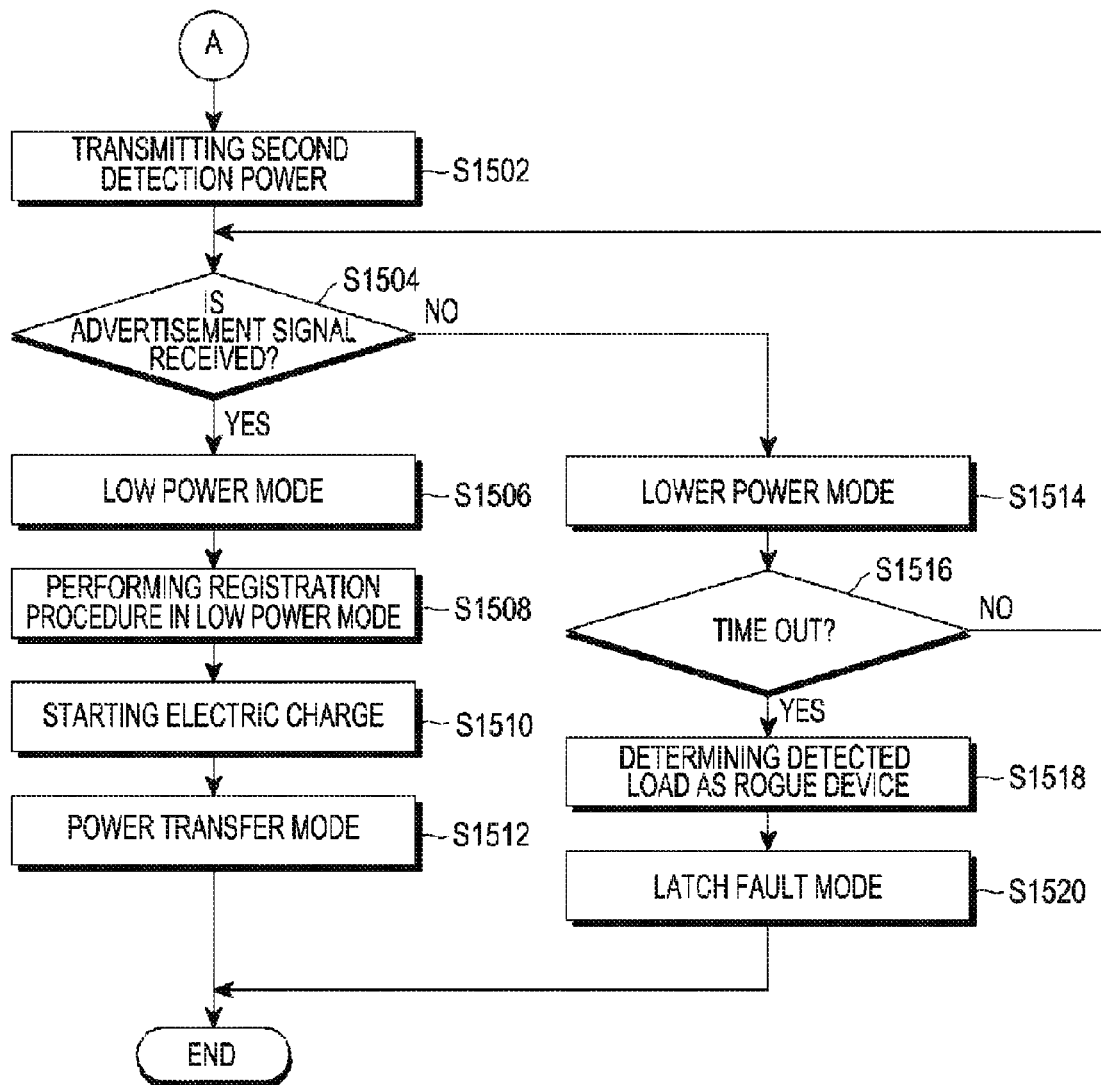

As the result of the comparison, if the detected load variation is greater than the second threshold, i.e., the detected load variation is greater than the first threshold value and the second threshold value in step S1410, the process of FIG. 15 is performed.

Referring to FIG. 15, the second detection power, e.g., long beacon, is transmitted in step S1502 when the detected load variation is greater than the second threshold value.

When an advertisement signal is received in step S1504 after the PTU transmits the second detection power, the PTU is converted into the low power mode in step S1506 and then performs a registration procedure in the low power mode in step S1508. If the registration is normally completed, the PTU is converted into the power transfer mode in step S1512 and initiates the electric charge in step S1510.

In this event, although the PTU cannot receive an advertisement signal after transmitting the second detection power, the PTU may be maintained in the low power mode in order to wait for a reception of the advertisement signal for a predetermined time, e.g., a setting time, i.e., 500 ms of a registration timer, in step S1514.

When the advertisement signal is received within the predetermined setting time, the electric charging may be initiated after the registration procedure is performed.

When the PTU fails to receive the advertisement signal within the predetermined setting time and a timeout occurs in step S1516, the detected load is determined as a rogue device in step S1518, and the PTU may be converted into the latch fault mode in step S1520.

Hereinafter, a case where the impedance variation ΔZin is present between the first threshold $Th_1$ and the second threshold $Th_2$ (see FIGS. 16 and 17) and a case where the impedance variation ΔZin exceeds the second threshold value (see FIGS. 18 and 19) will be described with reference to FIGS. 16, 17, 18 and 19.

First Embodiment

Figure 16:
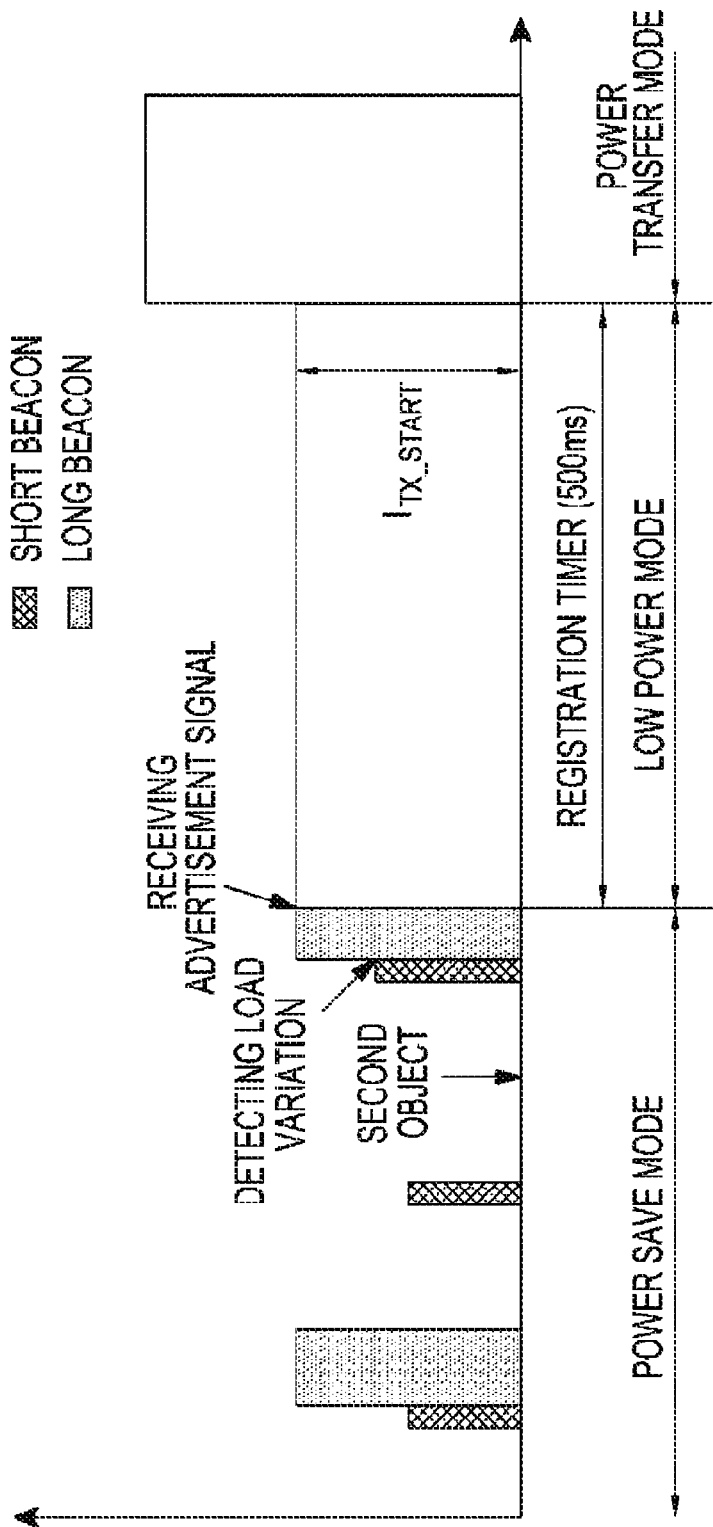
FIG. 16 illustrates an operation of a normal state in which a variation of impedance is between a first threshold and a second threshold according to an embodiment of the present invention.

First Threshold Value $Th_1$<Impedance Variation ΔZin<Second threshold value $Th_2$ FIG. 16 illustrates an operation of a normal state in which the impedance variation ΔZin is between the first threshold $Th_1$ and the second threshold $Th_2$ according to an embodiment of the present invention.

Referring to FIG. 16, while the PTU transmits the short beacon signal (or transmits the short beacon signal and the long beacon signal), the impedance variation ΔZin caused by the short beacon signal is measured when the second object is placed on the PTU, thereby detecting the second object.

In this case, if the impedance variation ΔZin is present between the first threshold value $Th_1$ and the second threshold $Th_2$, the PTU transmits the long beacon signal and communicates with the object, so as to wait for a reception of the advertisement signal. As shown in FIG. 16, when the PTU receives the advertisement signal within the predetermined time, the registration procedure may be performed in the low power mode.

Figure 17:
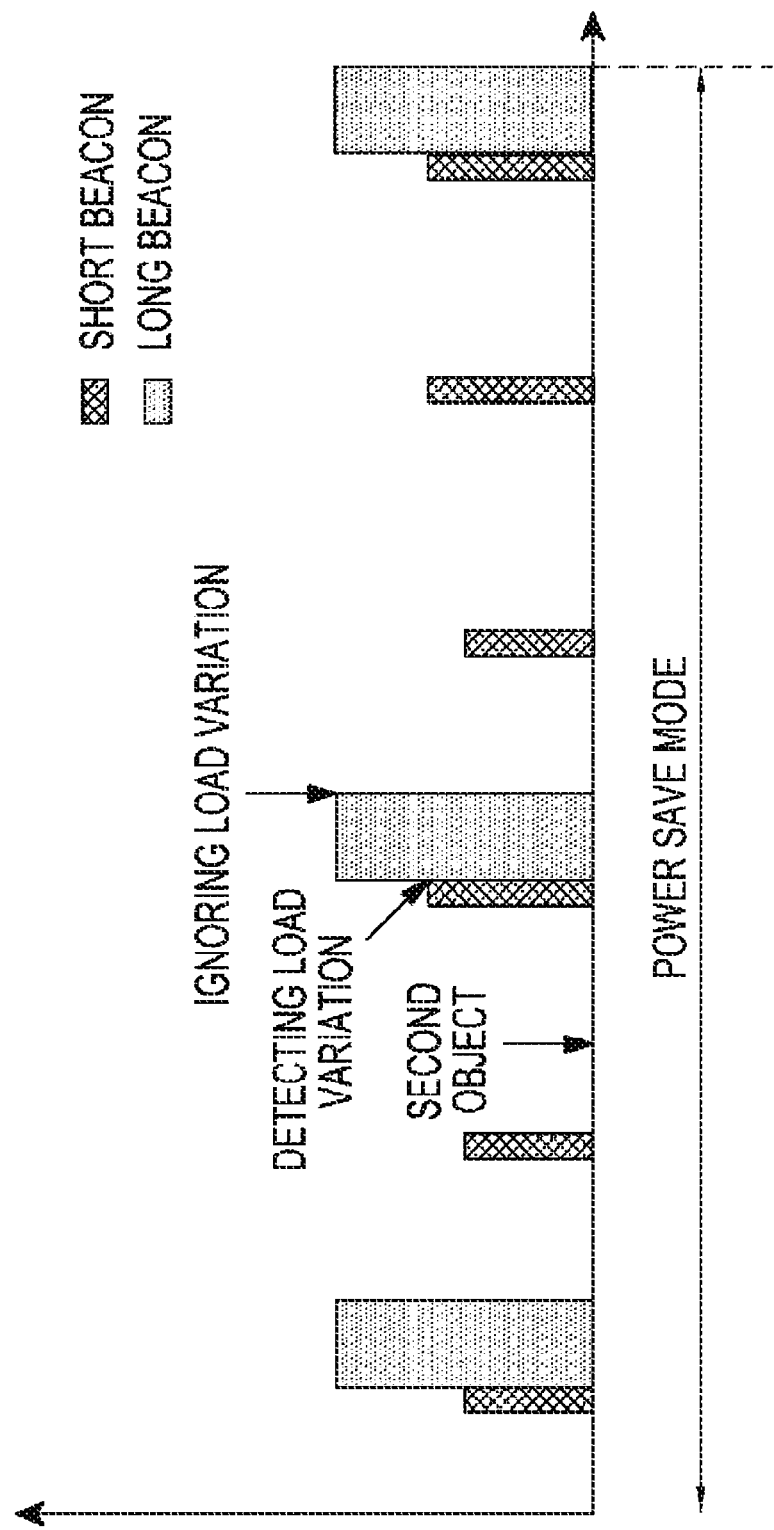
FIG. 17 illustrates an operation of an abnormal state in which the variation of impedance is between the first threshold and the second threshold according to an embodiment of the present invention.

As shown in FIG. 17, if the PTU fails to receive the advertisement signal, the PTU ignores the variation of load, and returns to the power save mode to transmit the short beacon signal. FIG. 17 illustrates an operation of an abnormal communication state in which the impedance variation ΔZin is between the first threshold $Th_1$ and the second threshold $Th_2$ according to an embodiment of the present invention.

Second Embodiment

Impedance Variation ΔZin>Second Threshold Value $Th_2$

Figure 18:
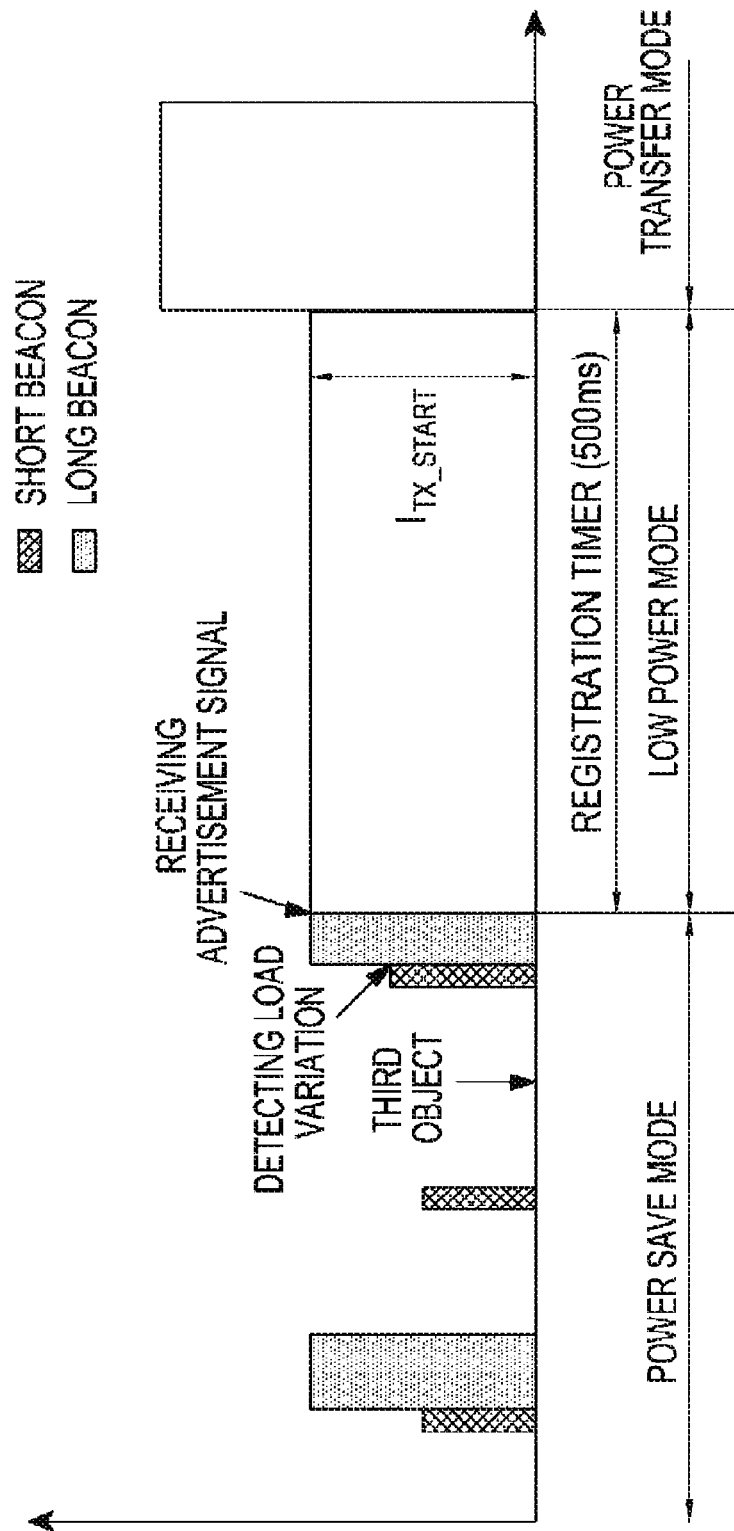
FIG. 18 illustrates an operation of a normal state in which the variation of impedance is equal to or greater than the second threshold according to an embodiment of the present invention.

FIG. 18 illustrates an operation of a normal state in which the variation of impedance is equal to or greater than the second threshold value $Th_2$ according to an embodiment of the present invention.

Referring to FIG. 18, while the PTU transmits the short beacon signal and the long beacon signal, the impedance variation caused by the short beacon signal is measured when the third object is placed on the PTU, thereby detecting the third object.

In this event, if the impedance variation ΔZin exceeds the second threshold $Th_2$, the PTU transmits the long beacon signal and communicates with the object, so as to wait for a reception of the advertisement signal. As shown in FIG. 18, when the PTU receives the advertisement signal within the predetermined time, the registration procedure may be performed in the low power mode, and the PTU initiates electric charging and enters the power transfer mode.

Figure 19:
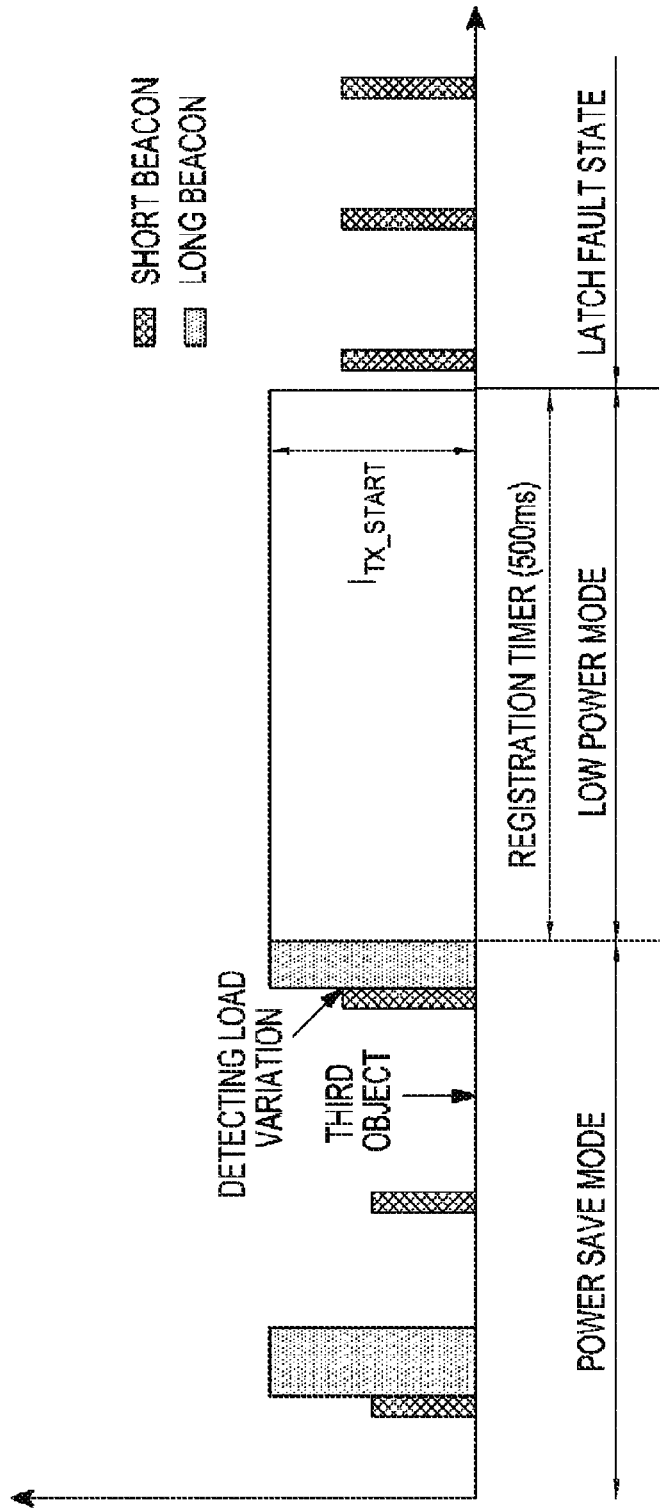
FIG. 19 illustrates an operation of an abnormal state in which the variation of impedance is equal to or greater than the second threshold according to an embodiment of the present invention.

As shown in FIG. 19, if the PTU fails to receive the advertisement signal, the PTU enters the low power mode. If the PTU does not complete the registration after a predetermined time for the registration lapses, the PTU determines that the corresponding object is the rogue device. Therefore, the PTU enters the latch fault mode.

While the present invention has been shown and described with reference to certain embodiments thereof, it will be understood by those skilled in the art that various changes in form and details may be made therein without departing from the spirit and scope of the present invention as defined by the appended claims. Therefore, various modified implementations can be made without departing from the substance of the present invention claimed in the appended claims, and the modified implementations should not be construed separately from the technical idea or prospect of the present invention.

What is claimed is:

1. A differential load detection method for detecting a wireless power receiver in a wireless power network, the differential load detection method comprising:
   transmitting first detection power for detecting the wireless power receiver;

transmitting second detection power when an impedance variation greater than a first threshold value and equal to or less than a second threshold value is detected; and scanning for an advertisement signal according to the transmission of the second detection power from the wireless power receiver.

2. The differential load detection method as claimed in claim 1, further comprising transmitting first detection power for detecting the wireless power receiver after a wireless Power Transmitting Unit (PTU) is converted into a power save mode, when failing to receive the advertisement signal.

3. The differential load detection method as claimed in claim 1, further comprising performing a registration procedure for the wireless power receiver which transmits the advertisement signal in a low power mode when the advertisement signal is received.

4. The differential load detection method as claimed in claim 1, further comprising transmitting second detection power when an impedance variation greater than a second predetermined threshold value is detected while the first detection power is transmitted, and scanning for the advertisement signal in a low power mode for a predetermined time.

5. The differential load detection method as claimed in claim 4, further comprising converting the PTU in a latch fault mode when the PTU fails to receive the advertisement signal within the predetermined time.

6. The differential load detection method as claimed in claim 4, further comprising performing a registration procedure for the wireless power receiver which transmits the advertisement signal in the low power mode when the advertisement signal is received within the predetermined time.

7. The differential load detection method as claimed in claim 1, wherein the first detection power is a short beacon signal which drives the wireless power receiver, and has an amount of power capable of communicating.

8. The differential load detection method as claimed in claim 1, wherein the second detection power is a long beacon signal which has a minimal power value capable of detecting a variation of load in the wireless power receiver.

9. A wireless power transmitter for detecting a wireless power receiver in a wireless power network, the wireless power transmitter comprising:

a power transmitting unit configured to transmit first detection power or second detection power for detecting the wireless power receiver; and a controller configured to control the power transmitting unit to transmit the second detection power and to scan for an advertisement signal according to the transmission of the second detection power when an impedance variation greater than a first threshold value but equal to or less than a second threshold value is detected during the transmission of the first detection power in the power transmitting unit.

10. The wireless power transmitter as claimed in claim 9, wherein the controller controls the power transmitting unit to be converted to a power save mode and to transmit the first detection power for detecting the wireless power receiver when the power transmitting unit fails to receive the advertisement signal.

11. The wireless power transmitter as claimed in claim 9, wherein the controller controls the power transmitting unit to perform the registration procedure for the wireless power receiver which transmits the advertisement signal in a low power mode when the power transmitting unit receives the advertisement signal.

12. The wireless power transmitter as claimed in claim 9, wherein the controller controls the power transmitting unit to transmit the second detection power when the impedance variation greater than the second threshold value is detected during an application of the first detection power, and to scan for the advertisement signal for a predetermined time in a low power mode.

13. The wireless power transmitter as claimed in claim 12, wherein the controller controls the power transmitting unit to be converted to a latch fault state when the advertisement signal is received within the predetermined time.

14. The wireless power transmitter as claimed in claim 12, wherein the controller controls the power transmitting unit to perform a registration procedure for the wireless power receiver which transmits the advertisement signal in a low power mode when the power transmitting unit receives the advertisement signal within the predetermined time.

15. The wireless power transmitter as claimed in claim 9, wherein the first detection power is a short beacon signal that drives the wireless power receiver and has an amount of power capable of communicating.

16. The wireless power transmitter as claimed in claim 9, wherein the second detection power is a long beacon signal that has a minimal power value capable of detecting a variation of load in the wireless power receiver.

* * * * *